US012686218B2

(12) United States Patent
Takehana

(10) Patent No.: US 12,686,218 B2
(45) Date of Patent: Jul. 21, 2026

(54) MEDIA EXCHANGER AND PRINTING DEVICE

(71) Applicant: MIMAKI ENGINEERING CO., LTD., Nagano (JP)

(72) Inventor: Soichiro Takehana, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 286 days.

(21) Appl. No.: 18/580,596

(22) PCT Filed: Aug. 5, 2022

(86) PCT No.: PCT/JP2022/030159
§ 371 (c)(1),
(2) Date: Jan. 18, 2024

(87) PCT Pub. No.: WO2023/013775
PCT Pub. Date: Feb. 9, 2023

(65) Prior Publication Data

US 2025/0083462 A1 Mar. 13, 2025

(30) Foreign Application Priority Data

Aug. 6, 2021 (JP) ................................. 2021-129764
Aug. 6, 2021 (JP) ................................. 2021-129765

(51) Int. Cl.
*B41J 15/04* (2006.01)
*B65H 16/06* (2006.01)
(Continued)

(52) U.S. Cl.
CPC ............. *B41J 15/042* (2013.01); *B41J 15/04* (2013.01); *B65H 16/06* (2013.01);
(Continued)

(58) Field of Classification Search
CPC . B41J 15/042; B41J 15/04; B41J 15/02; B41J 15/06; B41J 15/08; B41J 15/18;
(Continued)

(56) References Cited

U.S. PATENT DOCUMENTS 4,986,485 A * 1/1991 Soubrier ............ B65H 19/1868 242/554
6,328,249 B1 * 12/2001 Ogawa ................. B65H 19/126 242/573
10,301,132 B2 * 5/2019 Gonzalez Perello .. B65H 23/02

FOREIGN PATENT DOCUMENTS

JP H02208154 8/1990
JP 2000318886 11/2000
(Continued)

OTHER PUBLICATIONS

"International Search Report (Form PCT/ISA/210) of PCT/JP2022/030159", mailed on Oct. 18, 2022, with English translation thereof, pp. 1-4.

*Primary Examiner* — Henok D Legesse
(74) *Attorney, Agent, or Firm* — JCIPRNET

(57) ABSTRACT

A printer includes a printing portion that performs printing on a media, and a media exchanger that can hold a roll of a plurality of media and can move a specific roll among the rolls to a media supply position where the media can be supplied from the roll to the printing portion. The media exchanger includes a plurality of media holding parts and a rotating part. Each media holding part includes a set of clamping parts that rotatably clamps a single roll, and a guide part that slidably supports one or both of the clamping parts. The rotating part holds the plurality of media holding parts in an arrangement such that, when rotated about the rotation axis, the roll held by each media holding part comes to the media supply position once in the process of the rotation.

9 Claims, 16 Drawing Sheets

(51) Int. Cl.

| | |
|---|---|
| ***B65H 19/18*** | (2006.01) |
| *B41J 15/02* | (2006.01) |
| *B41J 15/06* | (2006.01) |
| *B41J 15/08* | (2006.01) |
| *B41J 15/18* | (2006.01) |
| *B65H 16/02* | (2006.01) |
| *B65H 18/02* | (2006.01) |

(52) U.S. Cl.
CPC ........... *B65H 19/1889* (2013.01); *B41J 15/02* (2013.01); *B41J 15/06* (2013.01); *B41J 15/08* (2013.01); *B41J 15/18* (2013.01); *B65H 16/02* (2013.01); *B65H 16/021* (2013.01); *B65H 16/023* (2013.01); *B65H 18/02* (2013.01); *B65H 18/021* (2013.01); *B65H 18/028* (2013.01)

(58) Field of Classification Search
CPC .... B65H 16/06; B65H 19/1889; B65H 16/02; B65H 16/021; B65H 16/023; B65H 18/02; B65H 18/021; B65H 18/028
See application file for complete search history.

(56) References Cited

FOREIGN PATENT DOCUMENTS

| | | |
|---|---|---|
| JP | 2003252493 | 9/2003 |
| JP | 2009243579 | 10/2009 |

* cited by examiner

MEDIA EXCHANGER AND PRINTING DEVICE

CROSS-REFERENCE TO RELATED APPLICATION

This application is a 371 application of the International PCT application serial no. PCT/JP2022/030159, filed on Aug. 5, 2022, which claims the priority benefits of Japan Patent Application No. 2021-129764, filed on Aug. 6, 2021, and Japan Patent Application No. 2021-129765, filed on Aug. 6, 2021. The entirety of each of the above-mentioned patent applications is hereby incorporated by reference herein and made a part of this specification.

TECHNICAL FIELD

The present invention relates to a media exchanger and a printing device.

BACKGROUND ART

Various media exchangers have been developed in which, when performing printing on a media with an inkjet printer, a plurality of media rolls (formed by winding a sheet material such as paper or fabric around a hollow core material to form a roll shape) are mounted in advance, and a media is selectively supplied to the printer from one of the media rolls. For example, Patent Literature 1 discloses a paper feeding device for a recording device using roll paper, the paper feeding device including a roll paper storage mechanism that stores a plurality of roll papers of the same type or different types in a predetermined order and sequentially circulates the plurality of roll papers of the same type or different types through a paper feeding unit in such an order, in order to save time and effort for paper replacement in a case where the same type of printing paper runs out or in a case of switching to different types of printing paper.

CITATION LIST

Patent Literature

Patent Literature 1: Japanese Unexamined Patent Publication No. 2003-252493

SUMMARY OF INVENTION

Technical Problems

However, the conventional media exchanger supports only a media roll having a shape complying with a specific standard, in particular, media roll having the same core material length, and a media roll of other standards cannot be mounted on the media exchanger.

In addition, the conventional media exchanger requires a drive-type feeding mechanism for each media roll in order to feed media from the individual media roll mounted on the media exchanger to the printing mechanism of the printing device. For this reason, in a case where media rolls of the media of a plurality of different materials are mounted in such a media exchanger, and these media rolls are appropriately used according to a user's demand, it is necessary to individually adjust and operate the feeding mechanism corresponding to the media roll to be used according to the material of the individual media while operating the feeding mechanism in cooperation with the feeding mechanism on the printing mechanism side, and the control of the conveyance of the media in the entire printing device is complicated. If such control fails, the media being conveyed may be torn or wrinkled, leading to deterioration of print quality. In addition, since a plurality of drive-type feeding mechanisms are required, such a media exchanger has a high running cost such as energy consumption or labor of maintenance and management.

In view of the above, an object of the present invention is to provide a media exchanger and a printing device capable of suitably conveying a media while appropriately using a plurality of different media rolls mounted on the media exchanger.

Solutions to Problems

A media exchanger according to a first aspect of the present invention is a media exchanger capable of holding a plurality of media rolls and moving a media roll which is specific in the plurality of media rolls to a media supply position where a media is capable of being supplied from the media roll to a printing portion of a printing device, the media exchanger including:

- a plurality of media holding parts; and
- a rotating part, configured to hold the plurality of media holding parts in an arrangement such that, when a rotation is performed about a rotation axis, the media roll held by each of the media holding parts comes to the media supply position once in a process of the rotation; where
- each of the media holding parts includes: a set of clamping parts, configured to rotatably clamp the single media roll; and a guide part, configured to slidably support one or both of the clamping parts.

According to the above configuration, the media rolls having different core material lengths can be held in the same media exchanger. As a result, media rolls of various standards having different core material lengths can be held in the same media exchanger, and the user can appropriately use these media rolls.

The guide part of at least one of the media holding parts includes a plurality of guide rods.

According to the above configuration, the clamping part can be firmly supported by the guide part. For example, this makes it possible to prevent the clamping part that clamps the media roll having a large weight from rotating about the contact location with the guide part.

The guide part of at least one of the media holding parts is configured to slidably support both of the clamping parts of the media holding part.

According to the above configuration, in the media exchanger, media rolls of various different standards can be exchanged with a simple configuration.

A media exchanger according to a second aspect of the present invention relates to a media exchanger capable of holding a plurality of media rolls and moving a media roll which is specific in the plurality of media rolls to a media supply position where a media is capable of being supplied from the media roll to a printing portion of a printing device, the media exchanger including

- a plurality of media holding parts, each being configured to hold a single media roll;
- a rotating part, configured to hold the plurality of media holding parts in an arrangement such that, when a rotation is performed about a rotation axis, the media roll held by each of the media holding parts comes to the media supply position once in a process of the rotation; and a pin lock mechanism, configured to automatically perform a lock of the rotation of the rotating part when a new media holding part is moved to the media supply position, and thereafter releases the lock by a manual operation.

According to the above configuration, undesired rotation of the rotating part can be prevented. For example, in a case where a plurality of media rolls having different weights are mounted on the media exchanger, this can prevent the rotating part from unintentionally rotating spontaneously, or prevent the user from erroneously reverse rotating the rotating part.

A media exchanger according to a third aspect of the present invention relates to a media exchanger capable of holding a plurality of media rolls and moving a media roll which is specific in the plurality of media rolls to a media supply position where a media is capable of being supplied from the media roll to a printing portion of a printing device, the media exchanger including:

a plurality of media holding parts, each configured to hold a single media roll;

a rotating part, configured to hold the plurality of media holding parts in an arrangement such that, when a rotation is performed about a rotation axis, the media roll held by each of the media holding parts comes to the media supply position once in a process of the rotation; and a ratchet mechanism, configured to prevent a reverse rotation of the rotating part.

According to the above configuration, undesired rotation of the rotating part can be prevented. For example, in a case where a plurality of media rolls having different weights are mounted on the media exchanger, this can prevent the rotating part from unintentionally rotating spontaneously, or prevent the user from erroneously reverse rotating the rotating part.

A printing device according to a fourth aspect of the present invention relates to a printing device including:

a printing portion, configured to perform a printing on a media; and a media exchanger according to first to third aspects of the present invention, configured to supply the media to the printing portion.

According to the above configuration, the user can appropriately use a plurality of different media rolls, for example, media rolls of various standards in the same printing device.

A printing device according to a fifth aspect of the present invention includes:

a printing portion, configured to perform a printing on a media while feeds the media in a predetermined direction; and a media exchanger, capable of holding a plurality of media rolls, and moving a media roll which is specific in the plurality of media rolls to a media supply position where the media is capable of being supplied from the media roll to the printing portion; where the printing portion includes a drive-type feeding mechanism that feeds the media.

According to the above configuration, since the drive-type feeding mechanism for feeding the media is unified in the printing portion, even when the media rolls of a plurality of media of different materials are mounted in the media exchanger, even in a case where these media rolls are appropriately used according to the request of the user, the conveyance of the media can be easily controlled. In addition, the running cost can be saved.

Effect of the Invention

According to the present invention, media can be suitably conveyed while appropriately using a plurality of different media rolls mounted on a media exchanger.

DESCRIPTION OF EMBODIMENTS

Figure 1:
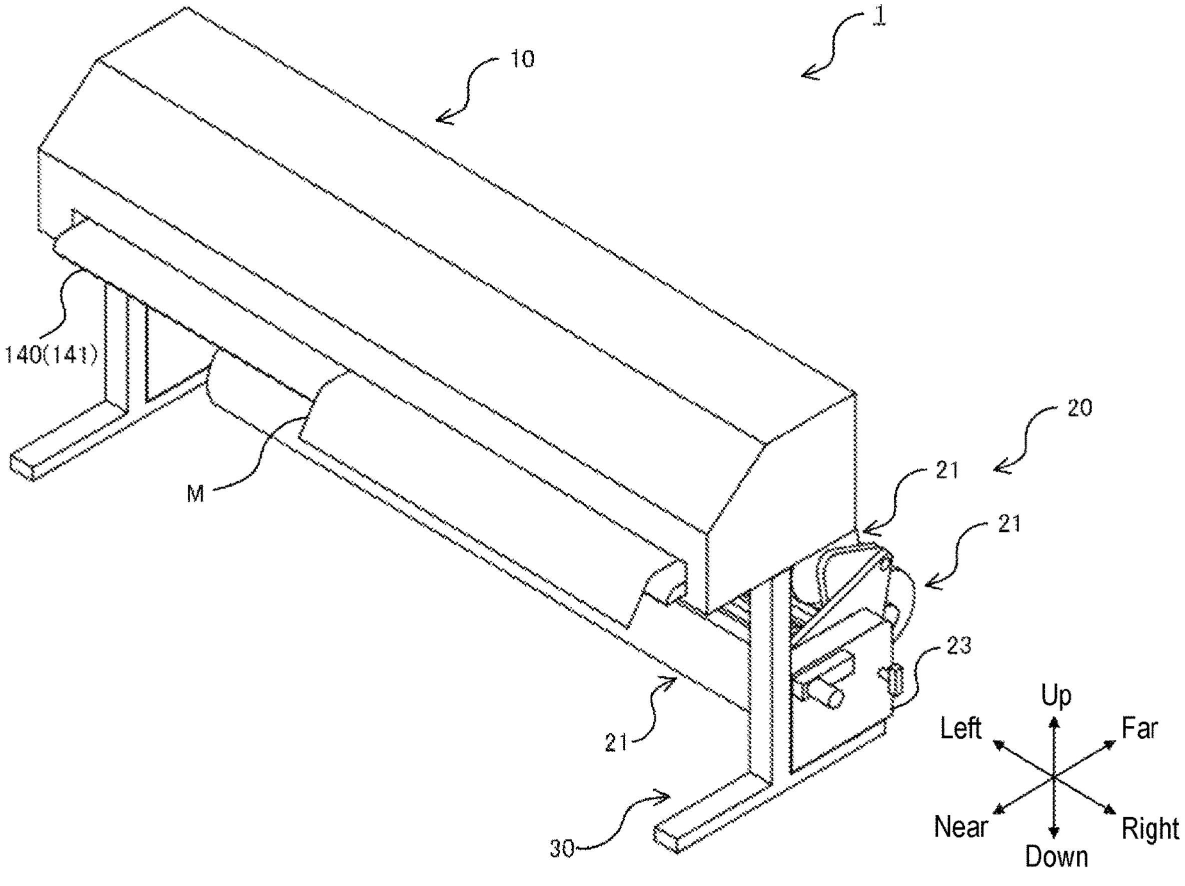
FIG. 1 is a front perspective view schematically illustrating a printer according to an embodiment of the present invention.

Hereinafter, a printer 1 according to an embodiment of the present invention will be described with reference to the drawings.

Configuration of Printer 1

The printer 1 is configured, for example, as shown in FIGS. 1 to 4, and prints an image on a media M by an inkjet method. The printer 1 includes a printing portion 10, a media exchanger 20, and a stand 30. The printing portion 10 is a portion that prints an image on the media M. The media M is, for example, a sheet material such as paper or fabric, and is stored in the form of a roll R wound around a hollow core material before printing. The media exchanger 20 can hold a plurality of rolls R including the media M having different core material lengths or different materials, and moves the specific roll R to a media supply position where the media M can be supplied from the roll R to the printing portion 10 as necessary. The printing portion 10 and the media exchanger 20 are supported by the stand 30 at a distance upward from the floor surface so that the printed media M discharged from the printing portion 10 and the roll R (in particular, the lower roll R) held by the media exchanger 20 do not touch the floor surface.

The printing portion 10 includes a print head 110, an ink supply mechanism 120, a head moving mechanism 130, a feeding mechanism 140, an input portion 150, and a controller 160.

When printing an image, the print head 110 ejects printing ink onto the media M by an inkjet method. The inkjet method is arbitrary, and may be either a piezoelectric method or a thermal head method. The printing ink is, for example, each ink of YMCK.

The ink supply mechanism 120 includes an ink supply path, and supplies the ink in the ink storage portion (e.g., an ink bottle or ink cartridge) to the print head 110 by the ink supply path.

The head moving mechanism 130 moves the print head 110 along the main scanning direction (the left-right direction in the figure). The head moving mechanism 130 includes a carriage on which the print head 110 is mounted, and a guide rail that guides the movement of the carriage in the main scanning direction. The head moving mechanism 130 further includes a driving belt to which the carriage is fixed, a driving pulley and a driven pulley around which the driving belt is wound, and a driving motor that rotates the driving pulley. The rotation of the driving motor rotates the driving belt, and moves the carriage in the main scanning direction.

The feeding mechanism 140 is a mechanism for feeding the media M in the sub scanning direction (the near-far direction in the figure). The feeding mechanism 140 includes a platen 141 that supports the media M, a driving motor, a driving roller that rotates by the driving motor, and a plurality of pinch rollers. The media M is sandwiched between the driving roller and the plurality of pinch rollers, and the media M is fed in the sub scanning direction by the rotation of the driving roller.

The input portion 150 includes a touch panel or the like that receives an operation from a user. The input portion 150 supplies an operation signal indicating the content of the operation received from the user to the controller 160.

The controller 160 controls the entire printer 1 based on the operation signal. The controller 160 includes, for example, various computers such as a microcomputer operated by a program. The controller 160 can communicate with an external host computer or the like, and image data is provided to the controller 160.

The media exchanger 20 includes a plurality of (for example, three) media holding parts 21, a rotating part 22, and a driving portion 23.

Figure 5:
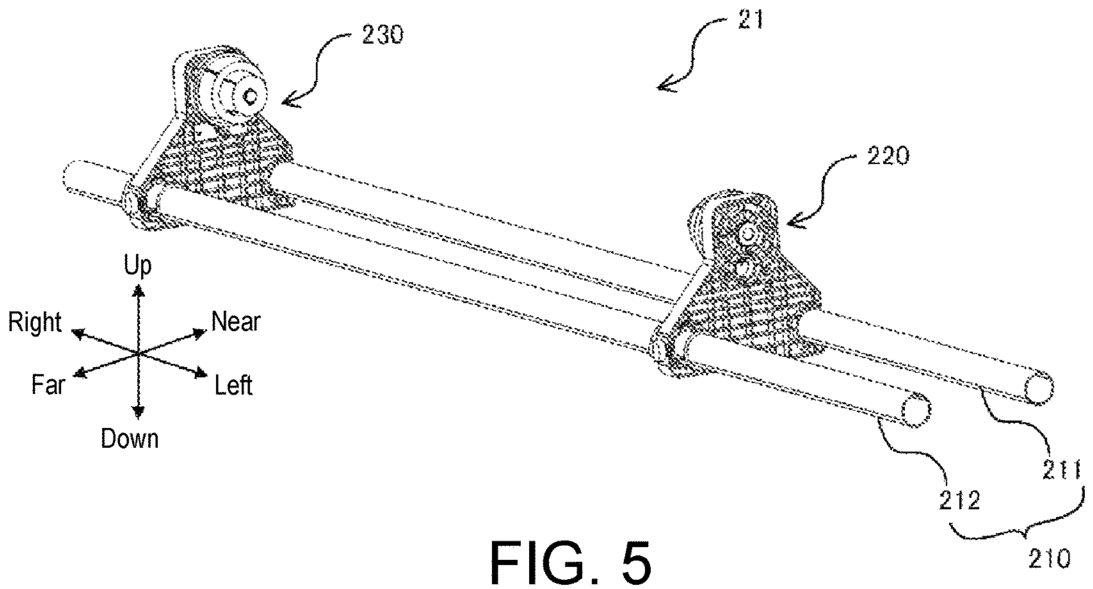
FIG. 5 is a perspective view showing a media holding part of FIG. 1.
Figure 6:
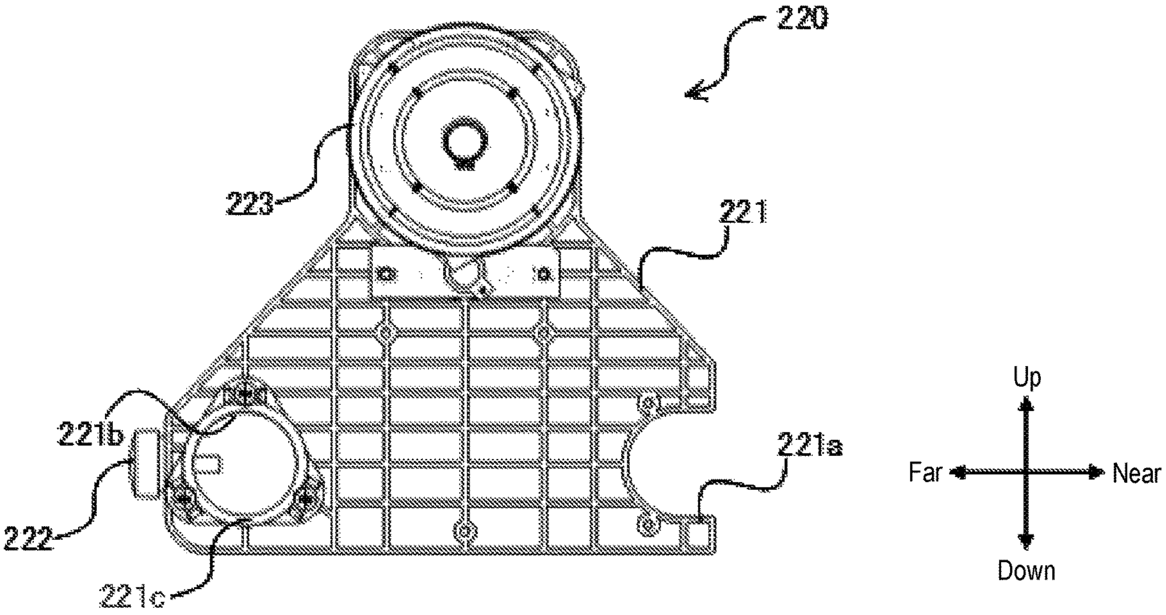
FIG. 6 is a front view showing a clamping part on the right side of the media holding part of FIG. 5.

Each media holding part 21 rotatably holds a single roll R. As shown in FIGS. 5 and 6, for example, the media holding part 21 includes a guide part 210, a right clamping part 220, and a left clamping part 230.

The guide part 210 is a member that slidably supports the left and right clamping parts 220 and 230, and includes two guide rods 211 and 212 arranged in parallel to each other.

The clamping parts 220 and 230 are fitted to the open ends of the hollow core material of the roll R, respectively, to rotatably clamp the roll R. The clamping part 220 includes a substrate 221, a set screw 222, and a fitting portion 223. The substrate 221 is provided with a through hole **221*a* through which the guide rod 211 passes and a through hole 221*b* through which the guide rod 212 passes. The set screw 222 screws the guide rod 212 in the through hole 221*b*. The substrate 221 may further include a sleeve 221*c* defining the through hole 221*b*. The sleeve 221*c* is fixed to the main body of the substrate 221 by, for example, a screw. The surface defining the through hole 221*b* of the sleeve 221*c* is configured so that the guide rod 212 does not rotate in the through hole 221*b*, and is formed of, for example, a material having a high coefficient of friction with the surface of the guide rod 212. The sleeve 221*c* has a screw hole into which the set screw 222 is fitted and passed through, and the set screw 222 is passed through the screw hole to come into contact with the guide rod 212, thus pressing the guide rod 212 against the inner surface of the sleeve 221*c*, so that the guide rod 212 is fixed to the sleeve 221*c*, and furthermore the substrate 221. The fitting portion 223 is a member fitted to one of the open ends of the hollow core material of the roll R, and is rotatably fixed to the substrate 221. Similarly, the clamping part 230 includes a substrate 231 (through holes 231*a*, 231*b*), a set screw 232, and a fitting portion 233, and these structures are similar to the substrate 221 (through holes 221*a*, 221*b*), the set screw 222, and the fitting portion 223** except that these structures are arranged so as to face each other with the roll R interposed therebetween.

When attaching the roll R to the media holding part 21, the user first loosens the set screws 222 and 232 of the left and right clamping parts 220 and 230. Next, if there is a roll R already attached to the media holding part 21, the user slides one or both of the clamping parts 220 and 230 on the guide part 210 to remove from the roll R, and then removes the roll R from the media holding part 21. Next, if necessary, the user slides the clamping parts 220 and 230 on the guide part 210 to adjust the interval between the clamping parts 220 and 230 to be longer than the roll R to be newly attached. Next, the user fits one of the open ends of the core material of the roll R into the fitting portion (e.g., the fitting portion 223 of the clamping part 220) of one of the clamping parts, and then slides the other clamping part (e.g., the clamping part 230) toward the roll R side to fit the fitting portion (e.g., the fitting portion 233) of the other clamping part into the other open end of the core material of the roll R. Finally, the user fastens the set screws 222 and 232 of the clamping parts 220 and 230 to fix both clamping parts 220 and 230 to the guide part 210. In this manner, the roll R having different core material lengths can be attached to the media holding part 21.

The rotating part 22 is a set of shaft plates having a substantially rotationally symmetric shape, and a plurality of media holding parts 21 are inserted and fixed to both shaft plates rotationally symmetrically about a common rotation axis of both plates and at equal intervals in the circumferential direction. Specifically, both ends of the guide rods 211, 212 are fixed to rotating part 22 such that guide rods 211, 212 sandwich rotating part 22. When the roll R held by a certain media holding part 21 is at the media supply position, if the rotating part 22 is rotated by a predetermined media exchange angle (e.g., 120°) in a predetermined media exchanging direction (e.g., in the drawing, counterclockwise from right to left) around the above-described rotation axis, the roll R held by the next media holding part 21 moves to the media supply position, and the media M can be supplied to the printing portion 10. The media exchange angle is determined according to the number of media holding parts 21, and is specifically an angle obtained by dividing 360° by the number of media holding parts 21.

Figure 7:
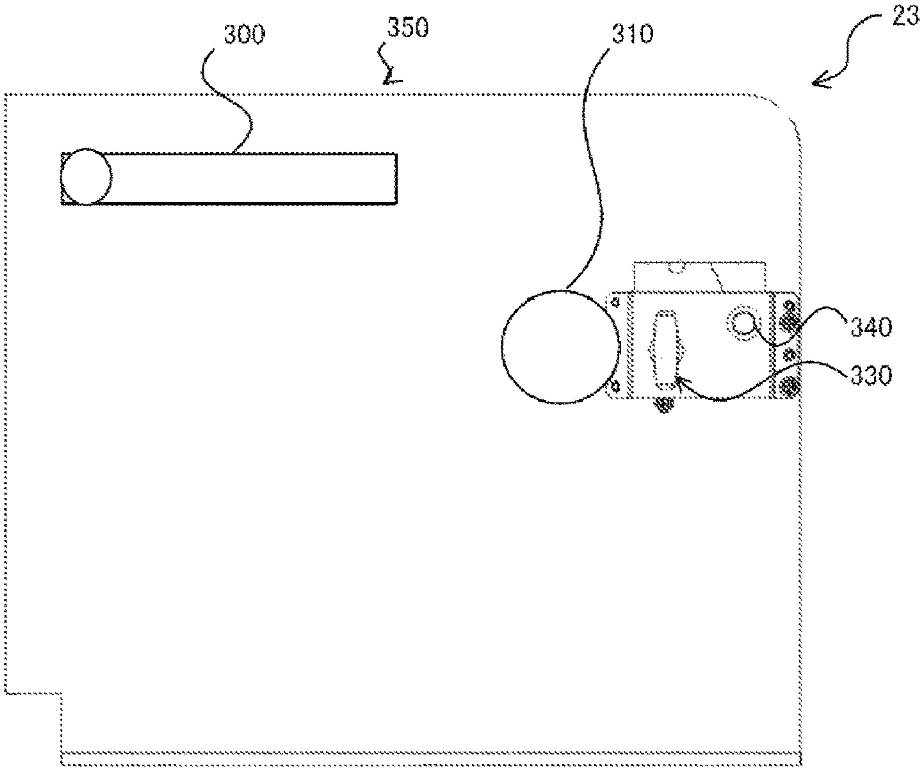
FIG. 7 is a front view showing details of a right side portion of a driving portion in FIG. 1.
Figure 8:
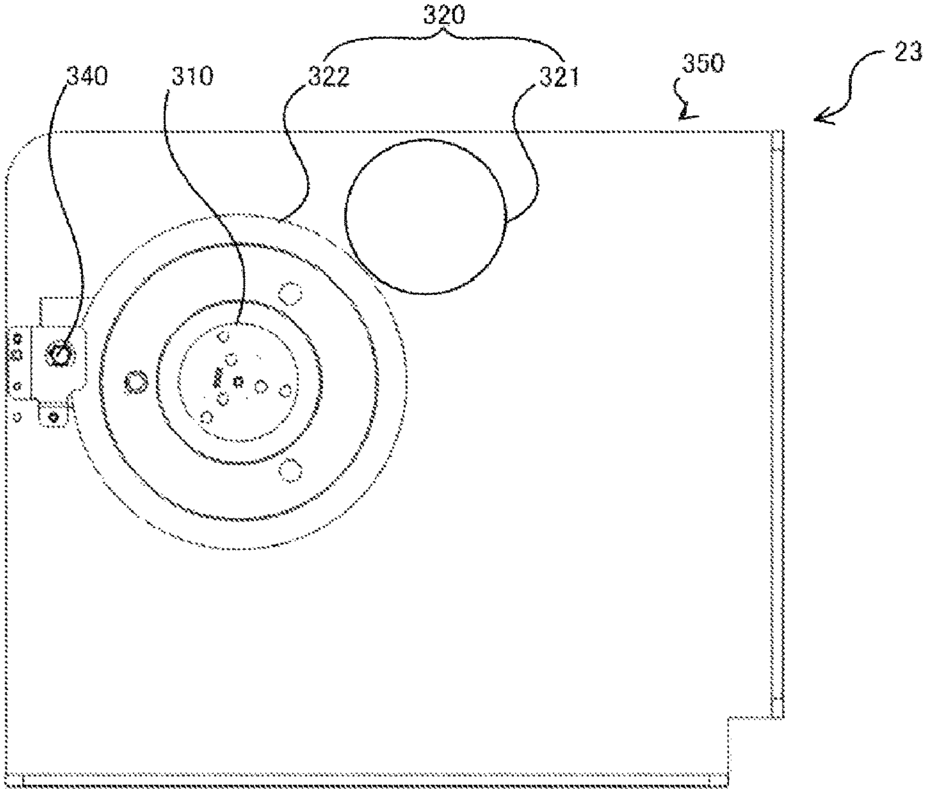
FIG. 8 is a rear view of the driving portion in FIG. 7.

The driving portion 23 rotates the rotating part 22 about a rotation axis in the media exchanging direction described above. The driving portion 23 includes a handle 300, a pair of left and right rotation shaft portions 310, a drive transmission mechanism 320, a pin lock mechanism 330, a lock pin restricting mechanism 340, and a pair of left and right supporting portions 350. Note that in FIGS. 7 and 8, only the right side portion of the driving portion 23 is illustrated, and the left side portion (left rotation shaft portion 310, left supporting portion 350) is not illustrated. The handle 300 is configured to be manually turned. The left and right rotation shaft portions 310 are fixed such that rotation axes thereof are coaxial with the left and right rotating parts 22. The drive transmission mechanism 320 transmits power by hand rotation of the handle 300 to the right rotation shaft portion 310 to rotate the right rotation shaft portion 310. When the handle is manually turned, the power is transmitted to the right rotation shaft portion 310 via the drive transmission mechanism 320, and the right rotation shaft portion 310 and thus the rotating part 22 rotates. In this way, by rotating the rotating part 22, the media holding part 21 that presents the roll R to the media supply position is changed. The supporting portion 350 is a member that supports each component of the driving portion 23, and in particular, operably supports the handle 300, the rotation shaft portion 310, the drive transmission mechanism 320, the pin lock mechanism 330, and the lock pin restricting mechanism 340.

The drive transmission mechanism 320 is a speed reducer, and includes, for example, a drive gear 321 directly connected to the hand turning shaft of the handle 300 so that the rotation axis is coaxial, and a driven gear 322 directly connected to the rotation shaft portion 310 so that the rotation axis is coaxial. The reduction ratio of the drive transmission mechanism 320 is set such that the media holding part 21 used for printing can be changed by turning the handle 300 for a reasonable number of times. In the drawings, gear teeth are omitted for simplification.

Furthermore, the driven gear 322 includes a pin hole 322*a* corresponding to the lock pin 331 and a convex portion 322*b* that moves the lock pin restricting mechanism 340. The same number of pin holes 322*a* as the number of media holding parts 21 are provided on the driven gear 322 rotationally symmetrically about the rotation axis and at equal intervals in the circumferential direction. The same number of convex portions 322*b* as the number of media holding parts 21 are provided on the driven gear 322 rotationally symmetrically about the rotation axis and at equal intervals in the circumferential direction.

Figure 9:
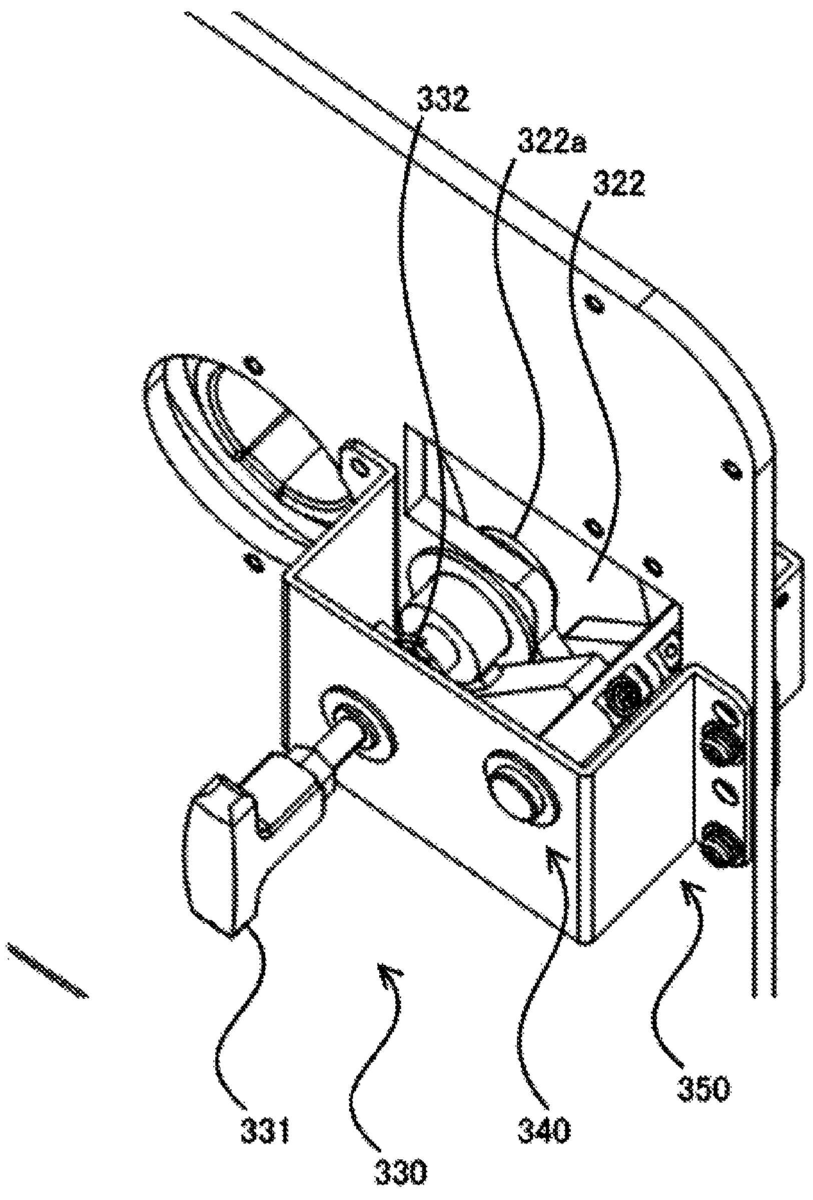
FIG. 9 is an enlarged view of the periphery of a pin lock mechanism of the driving portion of FIG. 7. A rotation shaft portion is omitted.
Figure 10:
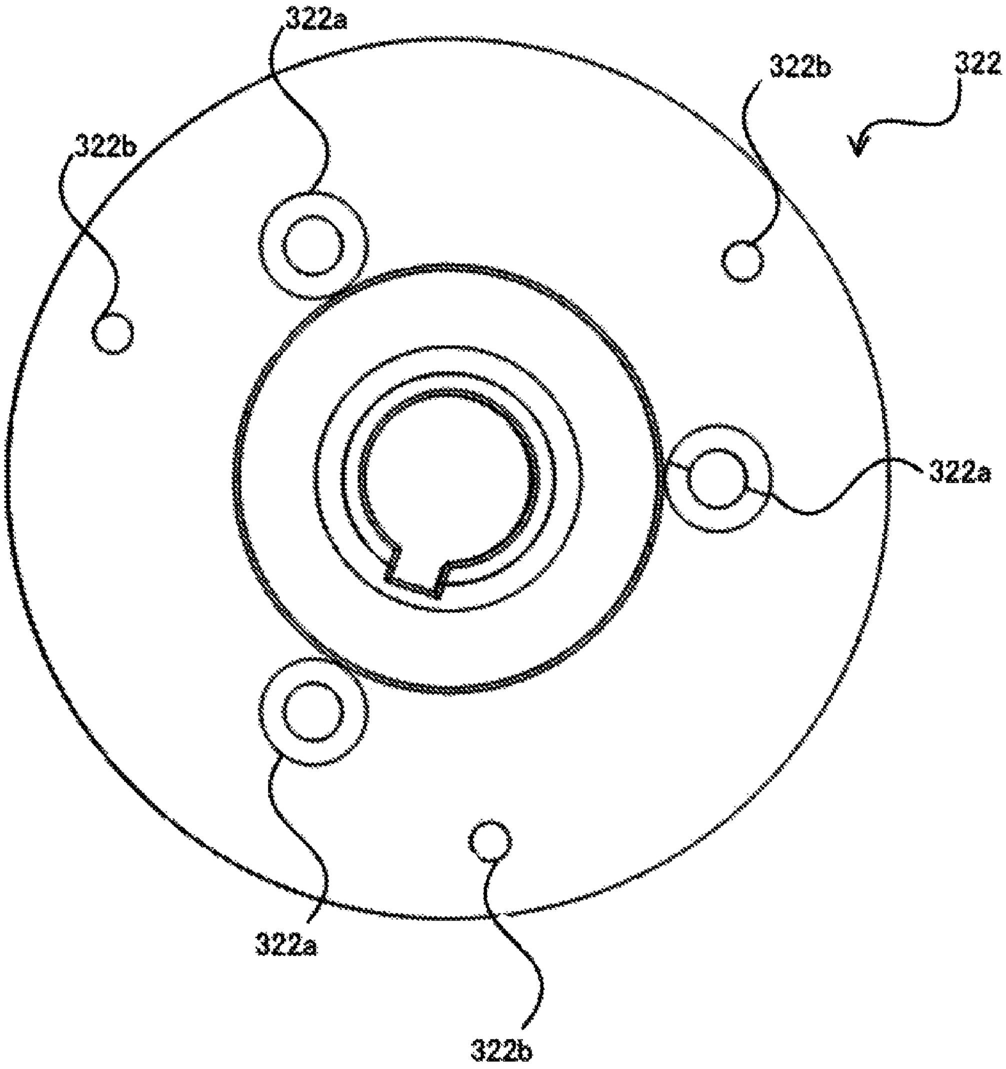
FIG. 10 is an enlarged view of a driven gear in FIG. 9.
Figure 11:
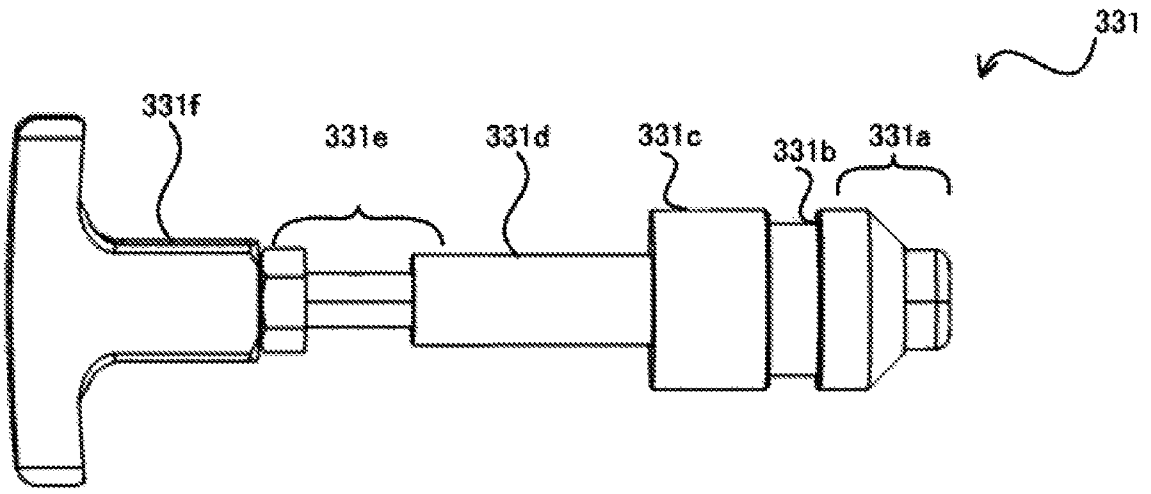
FIG. 11 is an enlarged view of a lock pin in FIG. 9.

The pin lock mechanism 330 is a pin lock type mechanism that automatically locks the rotation of the rotating part 22 when the new media holding part 21 moves to the media supply position, and then enables the lock to be released by manual operation. As illustrated in FIG. 11, the pin lock mechanism 330 includes a lock pin 331 and a spring 332. The lock pin 331 is a substantially rod-shaped component, and includes a pin portion 331*a*, a groove portion 331*b*, a spring pressing portion 331*c*, a spring accommodating portion 331*d*, a sliding restricting portion 331*e*, and a grip 331*f* in order from the distal end along the longitudinal direction. As illustrated in FIG. 9, the lock pin 331 is slidably held by the supporting portion 350 along a direction perpendicular to the driven gear 322. In a state where the pin lock mechanism 330 is locked, the pin portion 331*a* of the lock pin 331 is fitted into the pin hole 322*a* of the driven gear 322, and the rotation of the driven gear 322 is prevented. When the grip 331*f* is pulled to the outer side (in a direction of moving away from the driven gear 322) from the state in which the lock pin is locked, the pin lock mechanism 330 is released, the pin portion 331*a* is removed from the pin hole 322*a*, and the rotation of the driven gear 322 is enabled.

The pin portion 331*a* is a distal end portion of the lock pin 331, and is a convex portion fitted into a pin hole 322*a* provided in the driven gear 322.

The groove portion 331*b* is a groove that is engraved on the back side of the pin portion 331*a* of the lock pin 331 and is fitted to a convex portion 342*a* of a restricting portion 342 of the lock pin restricting mechanism 340 described later.

The spring pressing portion 331*c* is an enlarged portion disposed on the back side of the groove portion 331*b* of the lock pin 331. The spring pressing portion 331*c* presses the spring 332 together with a part of the supporting portion 350 in a state where the pin lock mechanism 330 is released.

The spring accommodating portion 331*d* is a shaft that is disposed on the back side of the spring pressing portion 331*c* of the lock pin 331 and around which the spring 332 is wound. The spring accommodating portion 331*d* restricts the biasing force of the spring 332 in the longitudinal direction of the lock pin 331 (direction perpendicular to the driven gear 322). Accordingly, in a state where the pin lock mechanism 330 is released, the lock pin 331 is biased in a direction of approaching the driven gear 322.

The sliding restricting portion 331*e* includes a shaft that connects the spring accommodating portion 331*d* and the grip 331*f*, and a connecting portion between the spring accommodating portion 331*d* and the grip 331*f* that is thicker than the shaft provided at both ends of the shaft. The shaft portion of the sliding restricting portion 331*e* is passed through a through hole provided in the supporting portion 350 and is slidably supported by the through hole, but the connecting portions at both ends of the sliding restricting portion 331*e* do not pass through the through hole. As a result, the movement of the lock pin 331 in the direction perpendicular to the driven gear 322 is restricted within a certain range by the sliding restricting portion 331*e*.

The grip 331*f* is disposed on the back side of the sliding restricting portion 331*e* of the lock pin 331. The user can unlock the lock pin 331 by pulling the grip 331*f* and lock the lock pin 331 by pushing the grip 331*f*.

Figure 12:
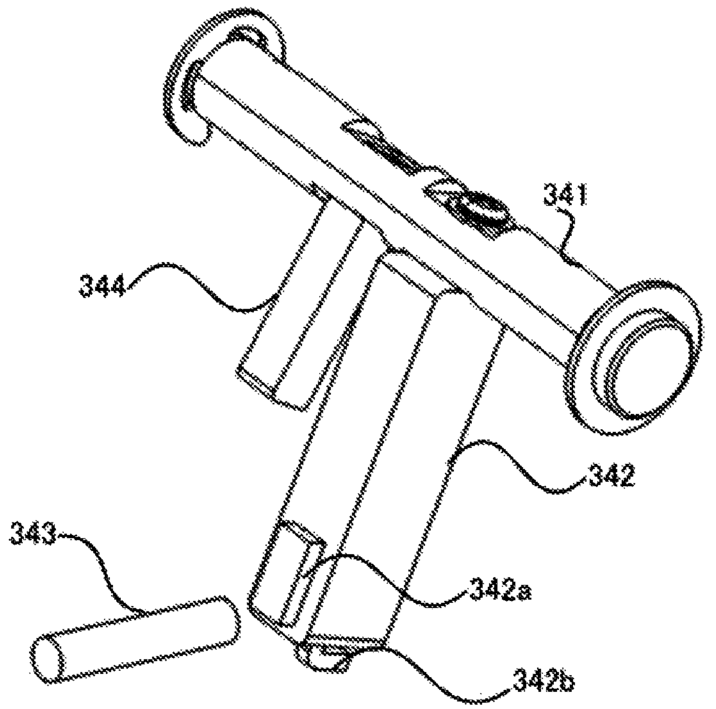
FIG. 12 is an enlarged view of the lock pin restricting mechanism of FIG. 9.

The lock pin restricting mechanism 340 is a mechanism that automatically restricts the movement of the lock pin 331 approaching the driven gear 322 after the pin lock mechanism 330 is released so that the pin lock mechanism 330 is maintained in the released state even if the user does not continue to pull the grip 331*f*. Furthermore, the lock pin restricting mechanism 340 automatically releases the restriction with the rotation of the driven gear 322. As illustrated in FIG. 12, the lock pin restricting mechanism 340 includes a shaft portion 341, a restricting portion 342, a magnet 343, and a releasing portion 344.

As illustrated in FIGS. 9 and 13 to 17, the shaft portion 341 is a shaft-shaped component held by the supporting portion 350 so as to be turnable within a plane parallel to the driven gear 322. The restricting portion 342 and the releasing portion 344 are fixed to the shaft portion 341, and when one of the restricting portion 342 and the releasing portion 344 is turned within a plane parallel to the driven gear 322, the other is also turned accordingly.

The restricting portion 342 is a rod-like component extending from the shaft portion 341, and includes a convex portion 342*a* and a magnetic body portion 342*b* at a distal end thereof. The convex portion 342*a* is a convex portion that fits into the groove portion 331*b* of the lock pin 331. The magnetic body portion 342*b* is made of a magnetic body material attracted to the magnet 343.

Figure 14:
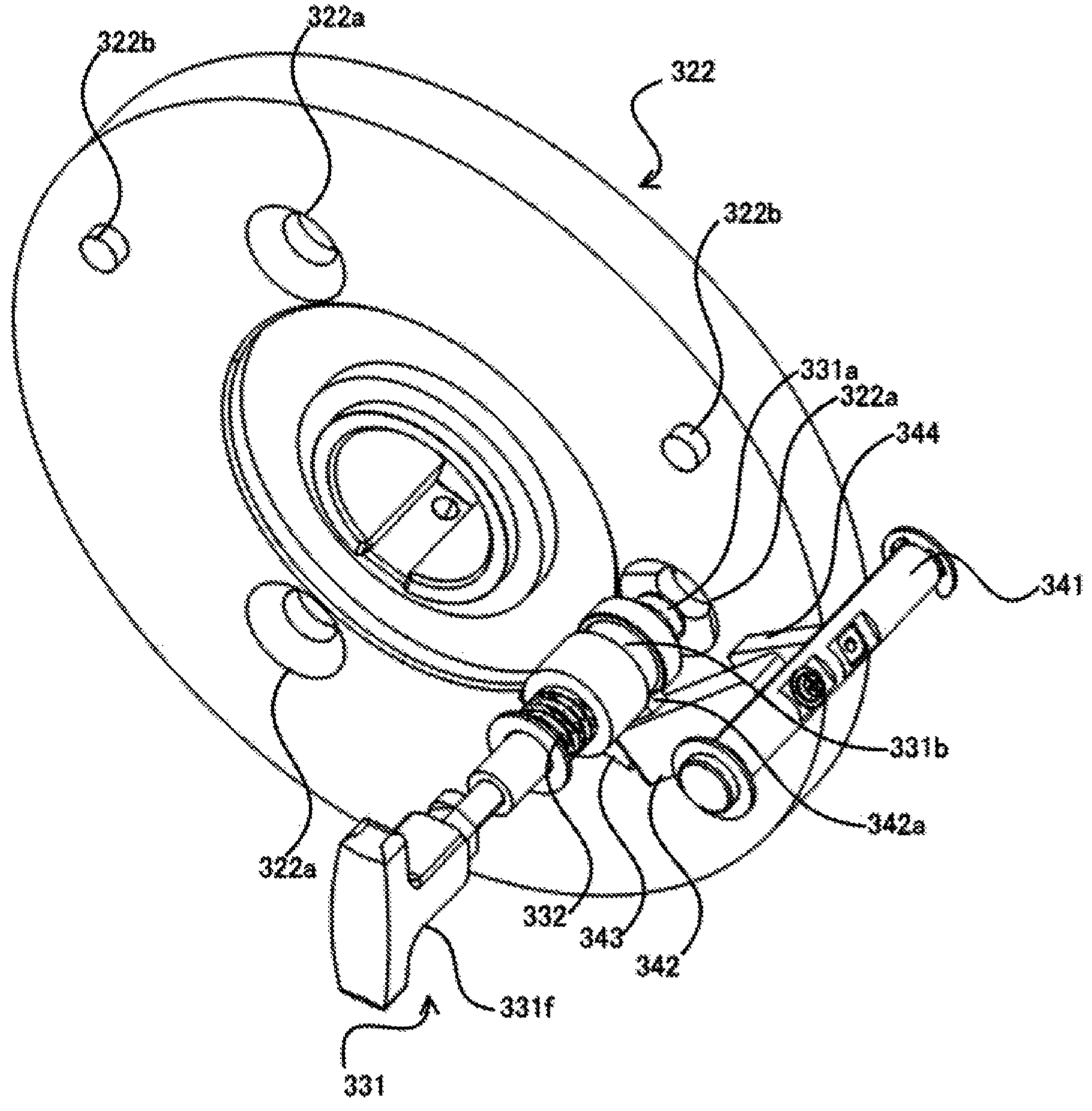
FIG. 14 is a view after the pin lock is released in FIG. 13.

The magnet 343 biases the entire restricting portion 342 in a direction of approaching the lock pin 331 through the magnetic body portion 342*b*. As a result, the distal end of the restricting portion 342 is maintained in a state of being in contact with the side surface of the lock pin 331 except when the releasing portion 344 comes into contact with the convex portion 322*b* of the driven gear 322. Then, when the pin lock mechanism 330 is released and the lock pin 331 moves in a direction away from the driven gear 322, the convex portion 342*a* of the restricting portion 342 is fitted into the groove portion 331*b* of the lock pin 331 in the process of the movement as illustrated in FIG. 14, and the lock pin 331 is prevented from moving in a direction of approaching the driven gear 322.

The releasing portion 344 is a rod-like component extending from the shaft portion 341, and is configured to collide with the convex portion 322*b* of the driven gear 322 when the driven gear 322 is rotated in the media exchanging direction. When the convex portion 322*b* collides with the releasing portion 344 in this way, the releasing portion 344 turns in a direction of moving away from the lock pin 331, and in conjunction therewith, the restricting portion 342 also turns in a direction of moving away from the lock pin 331. As a result, when the convex portion 342*a* of the restricting portion 342 is fitted in the groove portion 331*b* of the lock pin 331, the convex portion 342*a* is detached from the groove portion 331*b*, and the lock pin 331 can be moved again in a direction of approaching the driven gear 322.

Operation of Media Exchanger 20

Figure 13:
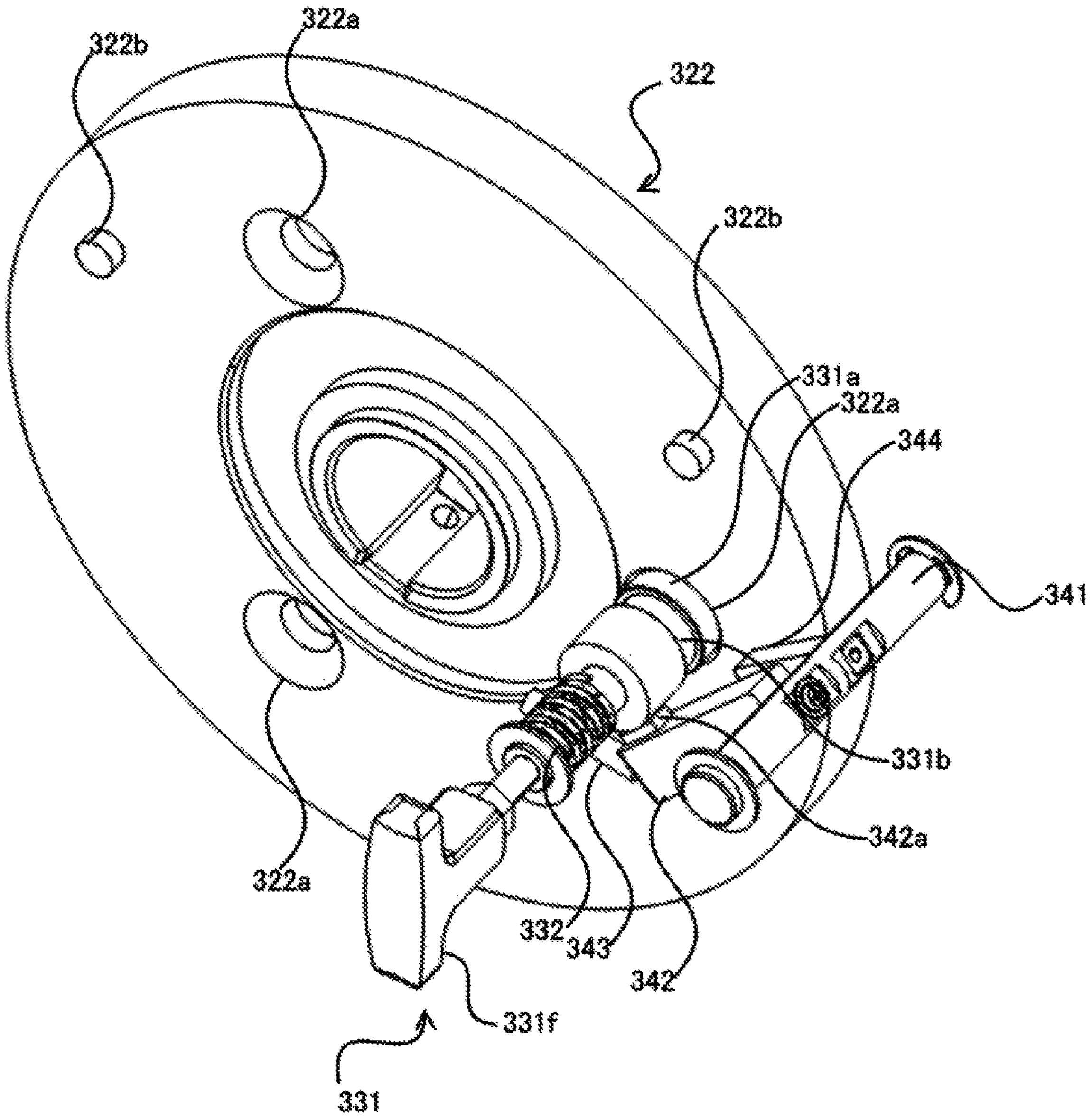
FIG. 13 is a view showing only the driven gear, the pin lock mechanism, and the lock pin restricting mechanism in FIG. 9.

First, when the roll R held by a certain media holding part 21 is at the media supply position (In FIGS. 1 to 3, the position where the uppermost media holding part 21 is located), the pin lock mechanism 330 is locked so that the entire rotating part 22 and the media holding part 21 do not rotate in either the front nor the back direction. When the pin lock mechanism 330 is locked, as illustrated in FIG. 13, the pin portion 331*a* of the lock pin 331 is fitted into the pin hole 322*a* of the driven gear 322, and the convex portion 342*a* of the restricting portion 342 of the lock pin restricting mechanism 340 is in contact with the side surface (in the figure, the side surface of the spring pressing portion 331*c*) of the lock pin 331 other than the groove portion 331*b*.

When exchanging the roll R of the media M used for printing with another roll R held in the media exchanger 20 from this state, the user first removes the media M being used from the feeding mechanism 140 of the printing portion 10. Next, the removed portion is cut with a cutting tool such as a cutter, or the portion removed by rotating the roll R in the media holding part 21 is rewound around the roll R, and the used roll R is brought into a state suitable for storage.

Next, the user pulls the grip 331*f* to release the pin lock mechanism 330. In a state where the pin lock mechanism 330 is released, the lock pin 331 is biased in a direction of approaching the driven gear 322, and thus when the user releases the hand from the grip 331*f* before the lock pin restricting mechanism 340 is actuated, the pin lock mechanism 330 automatically returns to the locked state again. When the user pulls the grip 331*f* until the lock pin restricting mechanism 340 is actuated, the lock pin restricting mechanism 340 restricts the movement of the lock pin 331 approaching the driven gear 322, and thus even if the user does not keep pulling the grip 331*f*, the pin lock mechanism 330 is maintained in the released state. After the lock pin restricting mechanism 340 actuated, as illustrated in FIG. 14, the pin portion 331*a* of the lock pin 331 is removed from the pin hole 322*a* of the driven gear 322, and the convex portion 342*a* of the restricting portion 342 of the lock pin restricting mechanism 340 is fitted into the groove portion 331*b* of the lock pin 331.

Figure 2:
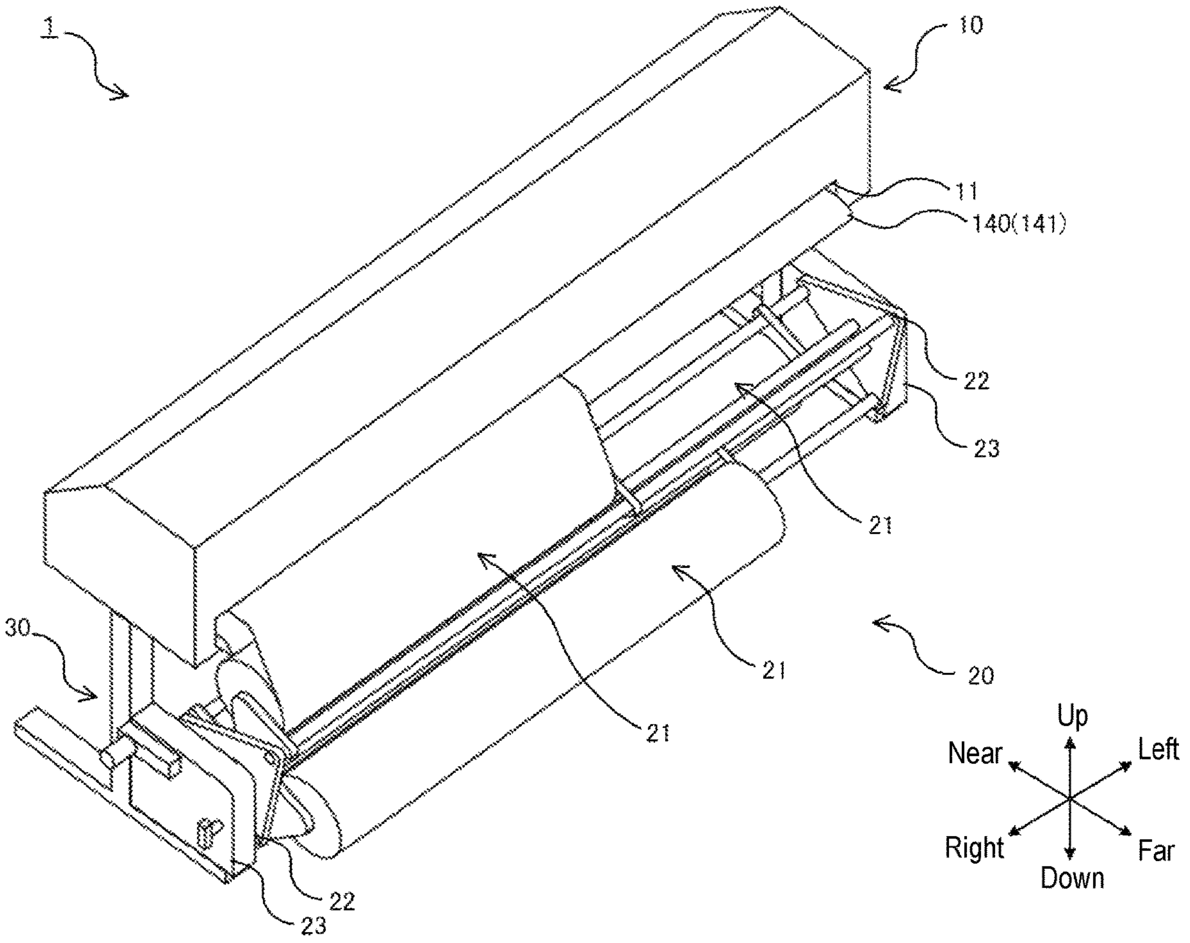
FIG. 2 is a rear perspective view schematically illustrating the printer of FIG. 1.
Figure 3:
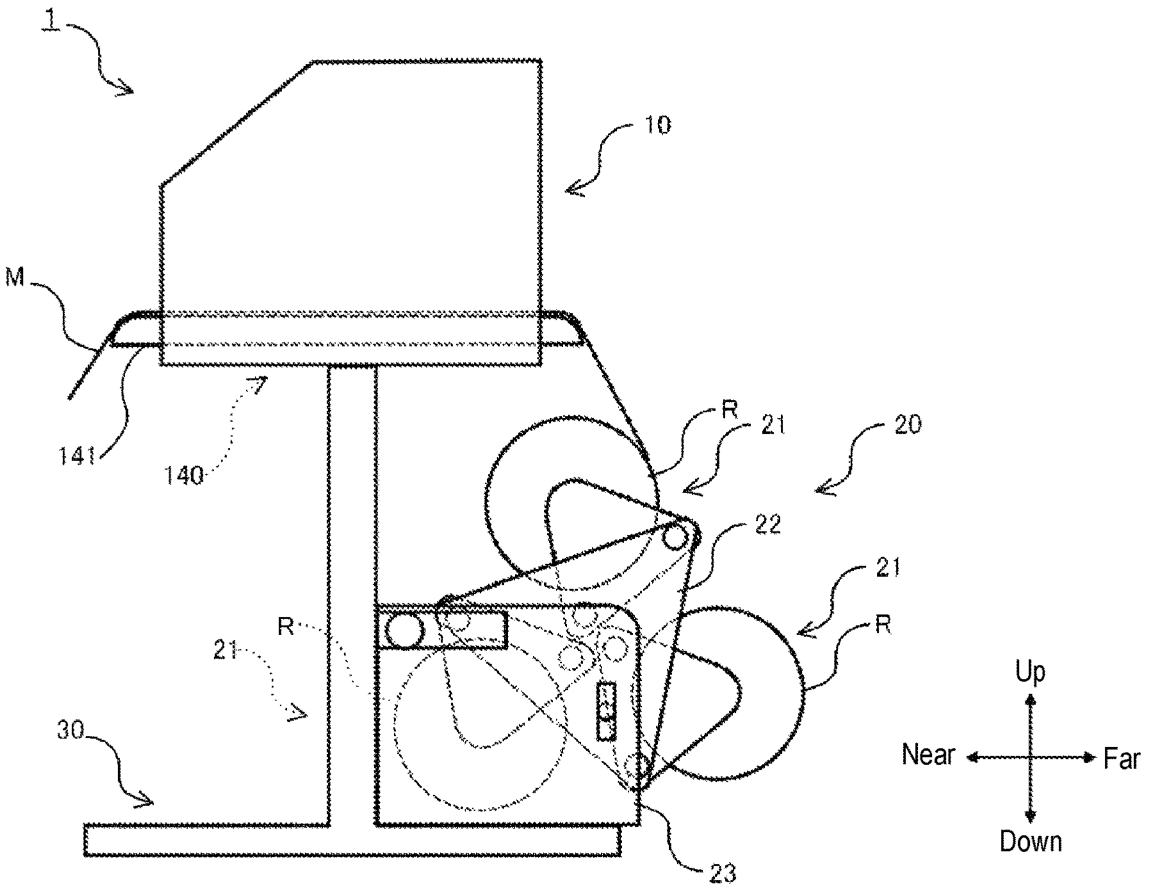
FIG. 3 is a side view schematically illustrating the printer of FIG. 1.
Figure 4:
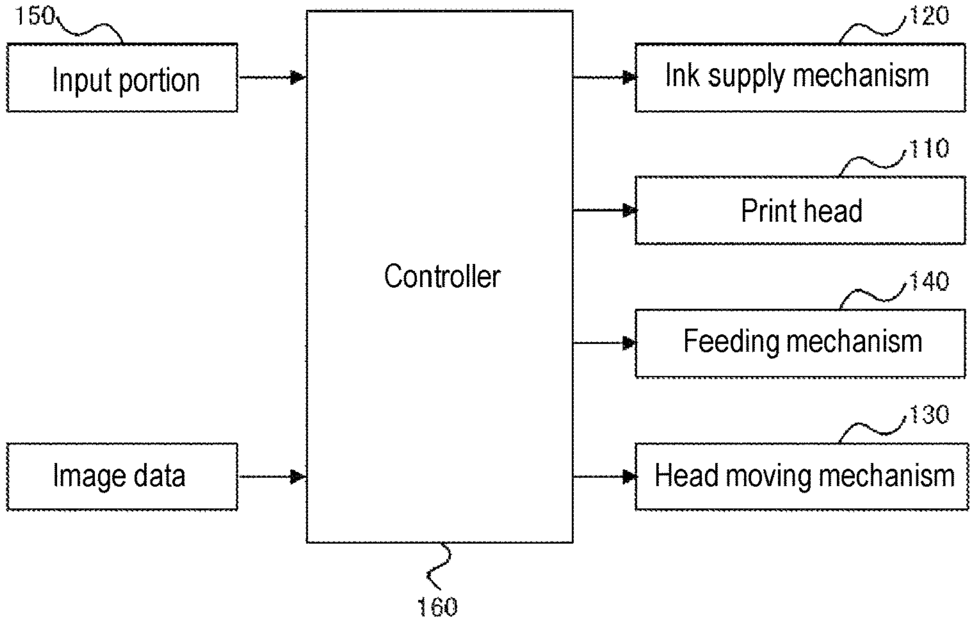
FIG. 4 is a block diagram showing a configuration of the inside of a printing portion of FIG. 1.

Next, the user turns the handle 300 in a predetermined direction (e.g., in FIGS. 1 to 3, clockwise from right to left) until the roll R held by the next media holding part 21 moves to the media supply position, and rotates the entire rotating part 22 and the media holding part 21 in the media exchanging direction (counterclockwise from right to left in FIGS. 1 to 3).

Figure 15:
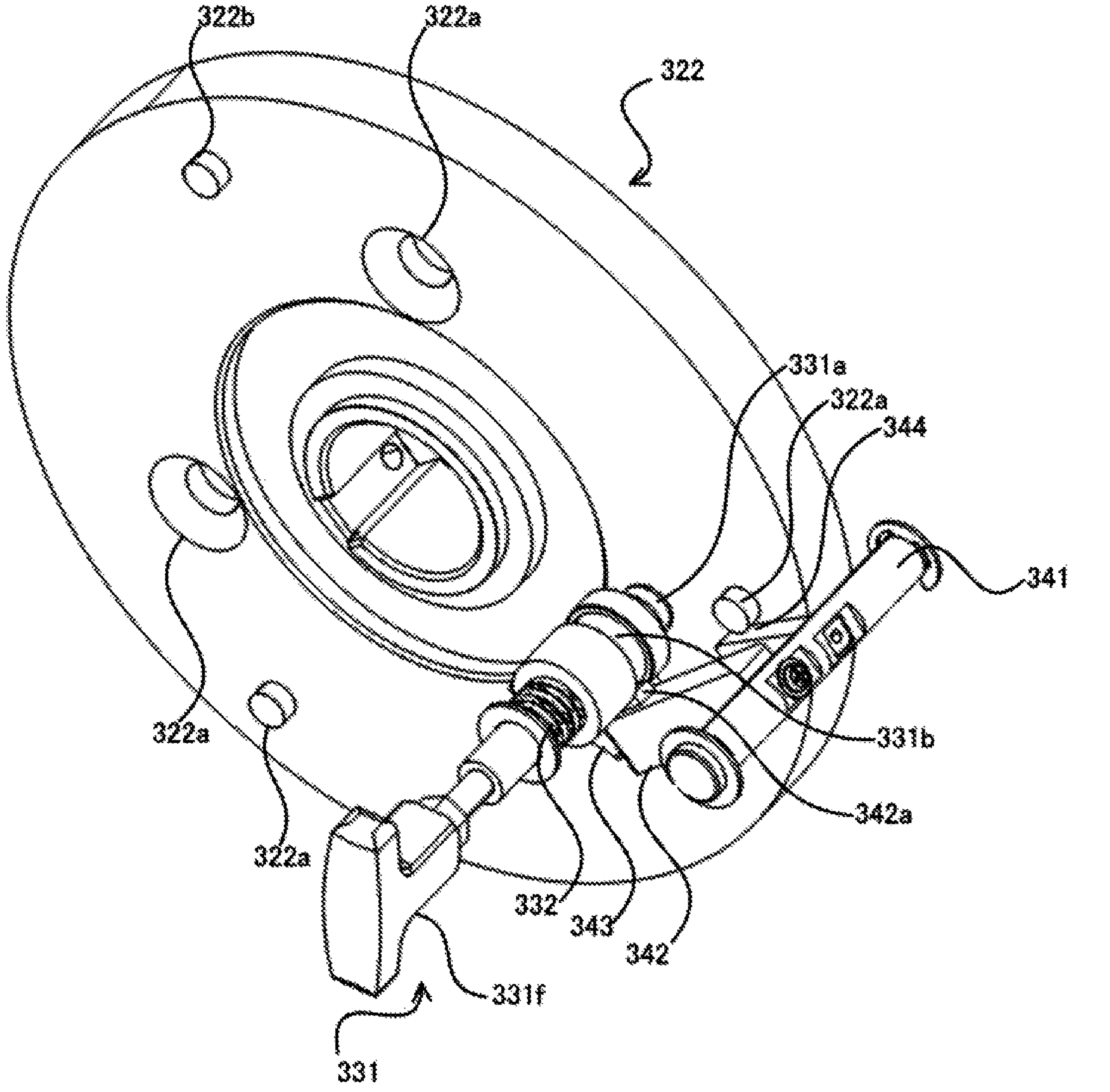
FIG. 15 is a view after the driven gear is rotated in FIG. 14.
Figure 16:
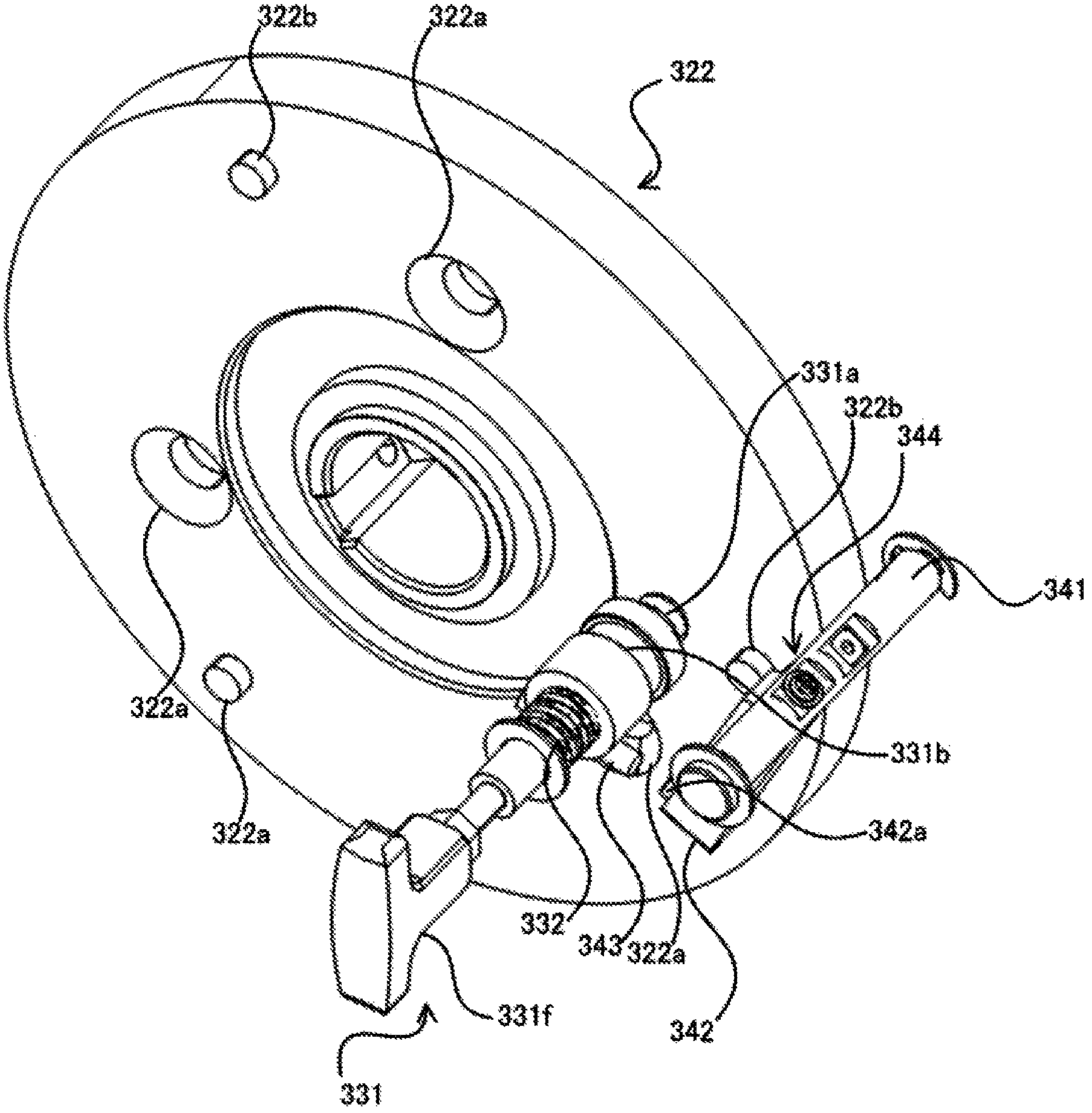
FIG. 16 is a view after the driven gear is further rotated in FIG. 15.

In this process, first, the restriction on the movement of the lock pin 331 approaching the driven gear 322 by the lock pin restricting mechanism 340 is automatically released. In a state where the pin lock mechanism 330 is released, the lock pin 331 is biased in a direction of approaching the driven gear 322, so that the lock pin 331 moves toward the driven gear 322. As illustrated in FIG. 15, immediately before the restriction by the lock pin restricting mechanism 340 is released, the pin hole 322*a* of the driven gear 322 does not exist in front of the pin portion 331*a* of the lock pin 331, and thus, as illustrated in FIG. 16, the lock pin 331 eventually collides with a place other than the pin hole 322*a* of the driven gear 322. Even in this state, the pin lock mechanism 330 is still in the released state.

Figure 17:
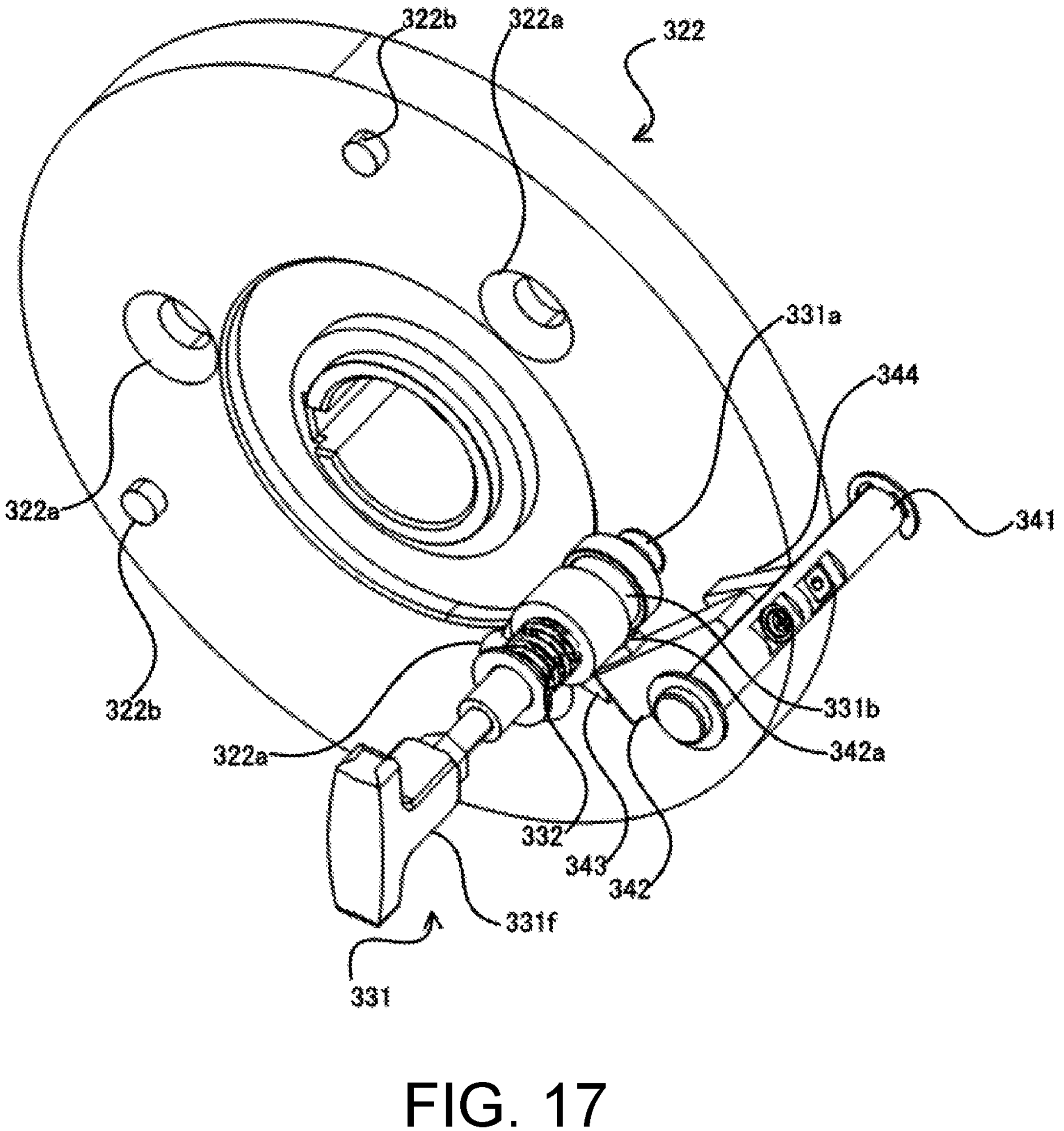
FIG. 17 is a view after the driven gear is further rotated in FIG. 16.

In addition, although the convex portion 342*a* of the restricting portion 342 of the lock pin restricting mechanism 340 is biased in the direction of approaching the lock pin 331, immediately after the restriction of the movement of the lock pin 331 by the lock pin restricting mechanism 340 is released, as illustrated in FIG. 16, it is inhibited by the convex portion 322*b* of the driven gear 322 and the releasing portion 344 of the lock pin 331 by the lock pin restricting mechanism 340, and thus, the convex portion 342*a* does not move toward the lock pin 331. Furthermore, even if this inhibition is released, after the lock pin 331 collides with a place other than the pin hole 322*a* of the driven gear 322, as illustrated in FIG. 17, the convex portion 342*a* of the restricting portion 342 of the lock pin restricting mechanism 340 comes into contact with the side surface other than the groove portion 331*b* of the lock pin 331 again, and the lock pin restricting mechanism 340 is in a standby state waiting for the next actuation.

Thereafter, when the roll R held by the next media holding part 21 moves to the media supply position, a state is obtained where the next pin hole 322*a* of the driven gear 322 exists in front of the pin portion 331*a* of the lock pin 331. In a state where the pin lock mechanism 330 is released, the lock pin 331 is biased in a direction of approaching the driven gear 322, so that the lock pin 331 moves toward the driven gear 322. As a result, as illustrated in FIG. 13, the next pin hole 322*a* of the driven gear 322 is fitted in front of the pin portion 331*a* of the lock pin 331, and the pin lock mechanism 330 is automatically locked again.

Finally, the user pulls out the media M from the roll R newly moved to the media supply position, and disposes a portion of the pulled-out media M on the feeding mechanism 140. Thus, the printer 1 can perform printing on the new media M.

Operation of Printer 1

The controller 160 controls the print head 110, the head moving mechanism 130, and the feeding mechanism 140 based on image data supplied from the outside of the printer 1 (such as a host computer) and data of the type of the media supplied from the outside of the printer 1 or input from the input portion 150, and prints an image indicated by the image data on the media M. The controller 160 drives the head moving mechanism 130 to control the print head 110 and eject ink at a timing based on the image data while moving the print head 110. Through such a process, one line of the image represented by the image data is printed. Thereafter, the controller 160 drives the feeding mechanism 140 to feed the media M by a predetermined amount in the sub scanning direction. The image is printed on the media M by repeatedly performing the printing of one line of the image, the feeding of the media M by the feeding mechanism 140, and the like.

In particular, during printing, the controller 160 optimizes the tension applied to the media M pulled out from the roll R at the media supply position by controlling the speed at which the feeding mechanism 140 feeds the media M in the sub scanning direction and/or the force by which the feeding mechanism 140 holds the media M (e.g., the rotational speed of the driving roller and/or the force for pressing the pinch roller against the media M) based on the data of the media type. For example, the tension applied to the media M at the time of printing is selected so as not to interfere with the printing on the media M due to the media M being torn or wrinkled. Furthermore, for example, the tension applied to the media M at the time of printing may be selected so as to enable the maximum feeding speed within a range not interfering with the printing on the media M.

Effects of the Present Embodiment

However, the conventional media exchanger supports only media rolls having a shape according to a specific standard, in particular, media roll having the same core material length, and a media roll of other standards cannot be mounted on the media exchanger.

However, in the present embodiment, the media exchanger 20 of the printer 1 can be attached to the same media holding part 21 even with media rolls having different core material lengths. Therefore, the user can easily use, according to purpose, media rolls of various standards in the printer 1.

In addition, the conventional media exchanger requires a drive-type feeding mechanism for each media roll in order to feed media from the individual media roll mounted on the media exchanger to the printing mechanism of the printing device. For this reason, in a case where media rolls of the media of a plurality of different materials are mounted in such a media exchanger, and these media rolls are appropriately used according to a user's demand, it is necessary to individually adjust and operate the feeding mechanism corresponding to the media roll to be used according to the material of the individual media while operating the feeding mechanism in cooperation with the feeding mechanism on the printing mechanism side, and the control of the conveyance of the media in the entire printing device is complicated. If such control fails, the media being conveyed may be torn or wrinkled, leading to deterioration of print quality. In addition, since a plurality of drive-type feeding mechanisms are required, such a media exchanger has a high running cost such as energy consumption or labor of maintenance and management.

However, in the present embodiment, since the media exchanger 20 does not have the drive-type feeding mechanism for feeding the media M, and only the printing portion 10 has the drive-type feeding mechanism 140 for feeding the media M, the drive-type feeding mechanism for feeding the media M is unified in the printing portion. Therefore, even in a case where a plurality of rolls R made of the media M of different materials are mounted on the media exchanger 20 and these rolls are used properly according to the user's request, the conveyance of the media M can be easily controlled simply by controlling the speed at which the feeding mechanism 140 feeds the media M in the sub scanning direction and/or the force by which the feeding mechanism 140 holds the media M. In addition, since it is not necessary to provide a plurality of feeding mechanisms in the media exchanger 20, the running cost and the manufacturing cost can be saved.

Modified Examples

The present invention is not limited to the above-described embodiments. Modified examples of the above embodiment are illustrated below. Note that the above-described embodiment and the various modified examples below can be combined as long as they do not contradict each other.

First Modified Example

In the embodiment described above, the printing method of the printer 1 is the inkjet method, but other methods may be used as long as printing can be performed on the roll R of the media M supplied from the media exchanger 20.

In addition, the configuration of the printer 1 other than the media exchanger 20 may be any known configuration conforming with the printing method as long as printing can be performed on the roll R of the media M supplied from the media exchanger 20. That is, the printer 1 may be a printing device including the printing portion 10 of any type that performs printing on the media M and the media exchanger 20 that supplies the media M to the printing portion 10.

Furthermore, the printer 1 may be a printing device that includes a printing portion 10 of any type that performs printing on the media M while feeding the media M in a predetermined direction, and a media exchanger 20 that supplies the media M to the printing portion 10, where a drive-type feeding mechanism that feeds the media M is provided in the printing portion 10, but is not provided in the media exchanger 20.

Furthermore, the roll R of the media M attached to the media exchanger 20 may have the same or different core material length, and may have the same or different material of the media M. Furthermore, the core material of the roll R of the media M attached to the media exchanger 20 is arbitrary as long as both ends thereof conform with attachment to the media exchanger 20 (e.g., the fitting portion 223 of the clamping part 220 and the fitting portion 233 of the clamping part 230), and is not limited to a hollow core material. For example, the core material may have a recess or other attachment means for attaching to the fitting portion 223 of the clamping part 220 and the fitting portion 233 to the clamping portion 230 at both ends of the solid core material.

Second Modified Example

The configuration of the media exchanger 20 is arbitrary as long as a plurality of rolls R, particularly a plurality of rolls R having different core material lengths can be held, and a specific roll R among the rolls R can be moved as necessary to a media supply position where the media M can be supplied from the roll R to the printing portion 10.

Third Modified Example

The configuration of the guide part 210 and the right and left clamping parts 220 and 230 constituting each media holding part 21 of the media exchanger 20 is arbitrary as long as a single roll R, particularly rolls R having different core material lengths can be rotatably held.

For example, as long as the guide part 210 slidably supports the clamping parts 220 and 230 along the longitudinal direction of the roll R when the roll R is held by the media holding part 21, the guide part 210 may be formed of one or three or more guide rods, or may be formed of one or more rails. Furthermore, the clamping parts 220 and 230 may be slidably fixed to the guide part 210 by any connection means conforming with the guide part 210 instead of the through holes 221*a*, 221*b*, 231*a*, and 231*b* provided in the substrates 221 and 231.

Furthermore, for example, the configurations of the fitting portions 223 and 233 of the clamping parts 220 and 230 are arbitrary as long as the roll R can be rotatably held. In the clamping part 220, other holding means configured to rotatably hold the roll R may be used instead of the fitting portion 223. Similarly, in the clamping part 230, other holding means configured to rotatably hold the roll R may be used instead of the fitting portion 233. For example, instead of the fitting portions 223 and 233, a recess, a through hole, or a bearing hole into which the end portion of the core material of the roll R can be inserted may be provided as a holding means in the clamping parts 220 and 230. In addition, the configuration of the clamping part 220 other than the fitting portion 223 or other holding means and the configuration of the clamping part 230 corresponding to the configuration may not necessarily be arranged to face each other with the roll R interposed therebetween.

Furthermore, for example, the fixing means configured to detachably fix the clamping parts 220 and 230 to the guide part 210 is not limited to the set screws 222 and 232, and other fixing means may be used. One of the clamping parts 220 and 230 may be permanently fixed to the guide part 210. In this case, the position of the clamping part of the media holding part 21 permanently fixed to the guide part 210 of each media holding part 21 may be adjusted to coincide when the roll R held by the media holding part 21 is moved to the media supply position. When one of the clamping parts 220 and 230 is permanently fixed to the guide part 210, the guide part 210 may only slidably hold the other of the clamping parts 220 and 230.

Furthermore, one media exchanger 20 may be configured to hold a plurality of rolls R. For example, one media exchanger 20 may be provided with a number of sets of clamping parts 220 and 230 corresponding to the number of rolls R to attach. In this case, the clamping part 220 and 230 disposed between the adjacent rolls R may be integrated to reduce the number of clamping parts 220 and 230. For example, instead of disposing the two clamping parts 220 and 230 between the adjacent rolls R, one clamping part 220 provided with holding means (e.g., the fitting portions 223 and 233) may be arranged on each of the left and right sides.

Fourth Modified Example

The configuration of the rotating part 22 of the media exchanger 20 is arbitrary as long as the plurality of media holding parts 21 are held in an arrangement such that the roll R held in each media holding part 21 comes to the media supply position once in the process of the rotation when rotated about the rotation axis by the driving portion 23. For example, the form of the rotating part 22 is arbitrary, and may be, for example, a set of rotatable frames instead of the set of shaft plates. In addition, in FIGS. 1 to 3, the shape of the rotating part 22 when the rotating part 22 is viewed in a plan view from right to left is a substantially rotationally symmetric shape, but other shapes may be used as long as the rotation of the rotating part 22 is not hindered.

Furthermore, in the above-described embodiment, the media holding part 21 is arranged on the rotating part 22 to be rotationally symmetric about the rotation axis of the rotating part 22, but the arrangement of the media holding part 21 on the rotating part 22 is arbitrary as long as the roll R held by each media holding part 21 comes to the media supply position once in the process of the rotation of the rotating part 22. For example, when the media holding parts 21 are rotated about the rotation axis of the rotating part 22, they may be in a positional relationship of overlapping each other. In this case, the media exchange angle required to move the roll R held by the next media holding part 21 to the media supply position when the roll R held by a certain media holding part 21 is at the media supply position may be different from the media exchange angle required to move the roll R held by the next media holding part 21 to the media supply position when the roll R held by another media holding part 21 is at the media supply position.

Fifth Modified Example

The media holding part 21 may conform with a plurality of core materials having different end portion shapes. For example, as illustrated in FIGS. 5 and 6, the fitting portions 223 and 233 of the clamping parts 220 and 230 roughly have a shape in which a disk having a small diameter is stacked on a disk having a large diameter. For this reason, a core material having an open end with a small diameter can be attached to a disk portion with a small diameter of the fitting portions 223 and 233 of the clamping parts 220 and 230, and a core material having an open end with a large diameter can be attached to a disk portion with a large diameter of the fitting portions 223 and 233 of the clamping parts 220 and 230. When the media is wound around the core material, properties such as load resistance and/or chemical properties required for the core material differ depending on the length or material of the media in the width direction, and thus it may be preferable to use core materials having different materials and shapes for each media. For example, in order to form a heavier media into a roll, it is preferable to use a harder and/or thicker core material. Therefore, when the rolls R of the plurality of media M having different lengths in the width direction (as a result, different core material lengths) or different materials are attached to the media exchanger 20, the present modified example is preferable in terms of being able to respond even when the shapes of the end portions of the core material of the rolls R are different.

Sixth Modified Example

The configuration of the driving portion 23 is arbitrary as long as the rotating part 22 can be rotated (e.g., rotated in the media exchanging direction by the media exchange angle necessary for the movement) to move the roll R of the next media holding part to the media supply position.

For example, in the driving portion 23, human power may be transmitted to the drive transmission mechanism 320 by other mechanical means such as a stepping pedal or a stepping plate instead of the handle 300. In addition, the motive power is not limited to human power, and the rotating part 22 may be rotated using power from a prime mover such as an electric motor instead of or in addition to human power. In the case of using the prime mover, the driving portion 23 may be provided with a switch for the user to switch on/off the prime mover. Furthermore, in a case where the prime mover is used for assisting human power, an electronic or mechanical device may be provided such the prime mover is turned on only while the handle 300 or other mechanical means is moved by human power instead of or in addition to the switch.

Figure 18:
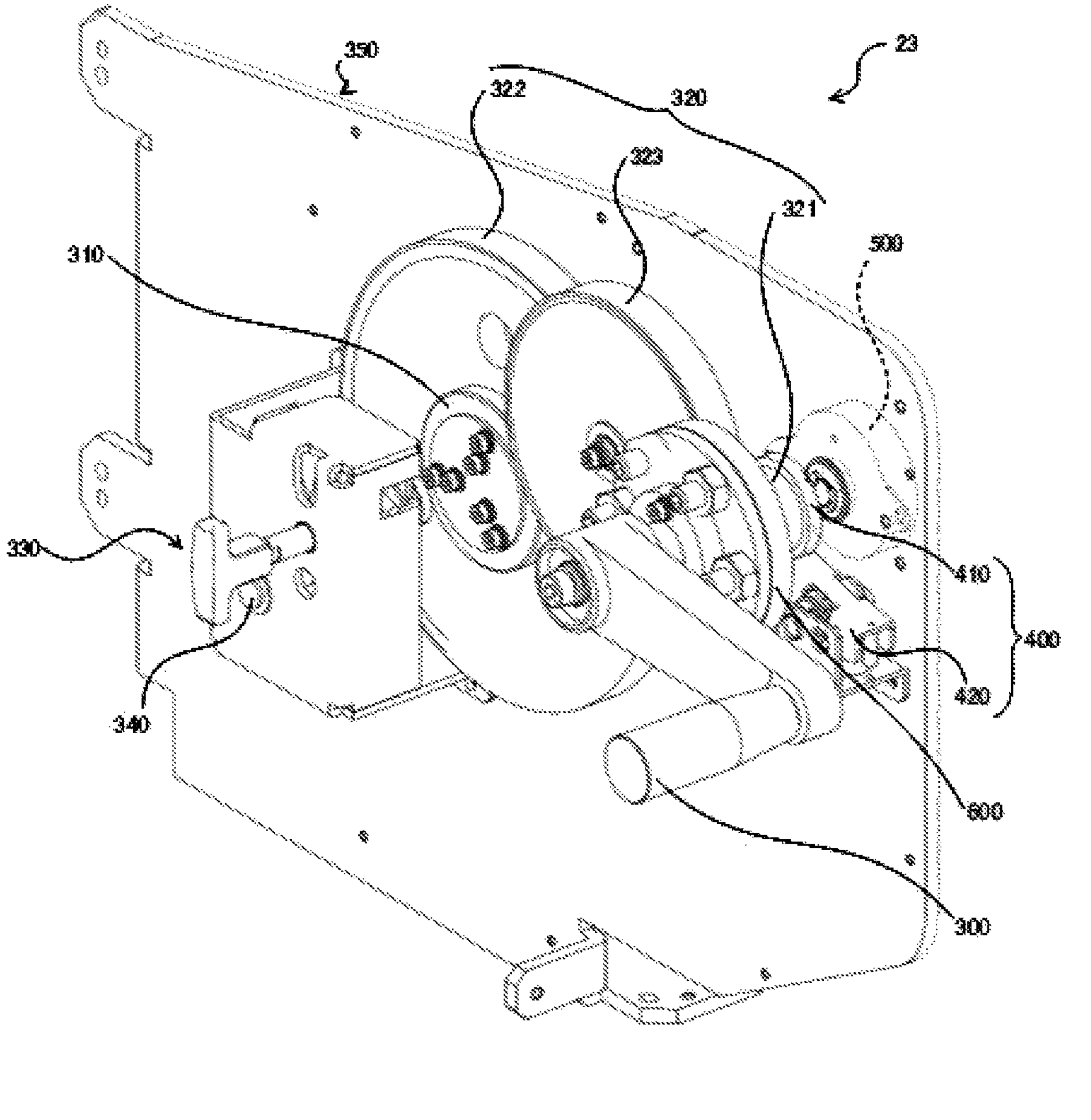
FIG. 18 is a perspective view illustrating a right side portion of a driving portion according to one modified example.
Figure 19:
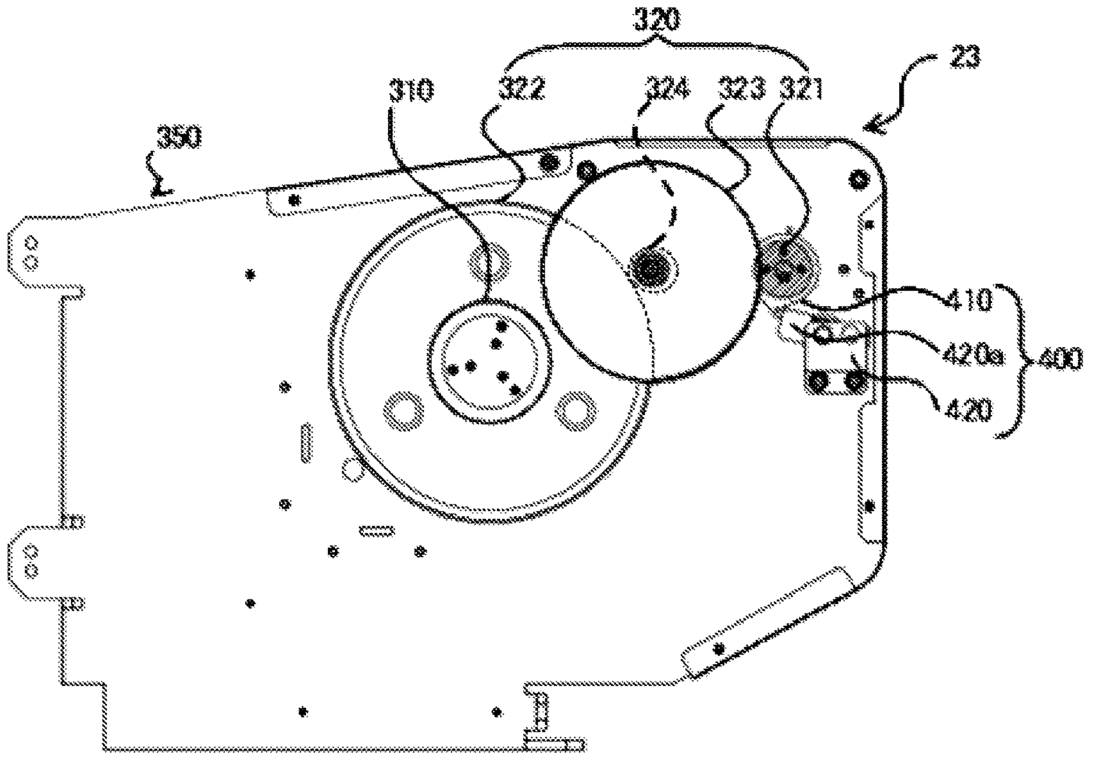
FIG. 19 is a front view showing details of a ratchet mechanism in a right side portion of the driving portion in FIG. 18. In the drawing, the pin lock mechanism, the lock pin restricting mechanism, and the handle are omitted.

The drive transmission mechanism 320 is arbitrary as long as it conforms with the mechanical means and the prime mover for inputting human power as described above. For example, as illustrated in FIGS. 18 and 19, a drive gear 321 directly connected to the hand turning shaft of the handle 300 so that the rotation axis is coaxial, a driven gear 322 directly connected to the rotation shaft portion 310 so that the rotation axis is coaxial, a driven gear 323 that meshes with the drive gear 321, and a driven gear 324 fixed to the same rotation axis as the driven gear 323.

The rotation shaft portion 310 is arbitrary as long as it is rotated by the drive transmission mechanism 320 and fixed to the rotating part 22.

The pin lock mechanism 330 may be any pin lock type mechanism as long as it automatically locks the rotation of the rotating part 22 when the new media holding part 21 moves to the media supply position, and thereafter, can release the lock by manual operation. For example, instead of the driven gear 322, the pin hole 322*a* and the convex portion 322*b* may be provided in a lock plate (e.g., fixed so that the rotation axis is coaxial with the rotating part 22) that interlocks with the rotating part 22 so that when one rotation is fixed, the other rotation is also fixed. In addition, the shapes of the pin portion 331*a* and the pin hole 322*a* are arbitrary as long as they can be fitted to each other and prevent the rotation of the driven gear 322 or the lock plate. The arrangement of the pin holes 322*a* in the driven gear 322 or the lock plate is arbitrary as long as the pin holes 322*a* are arranged in front of the pin portions 331*a* of the lock pin 331 when the roll R of each media holding part 21 is at the media supply position. Furthermore, the biasing means for biasing the lock pin 331 in a direction of approaching the driven gear 322 or the lock plate is not limited to the spring 332, and may be any biasing means. Furthermore, it is sufficient for the biasing means to bias the lock pin 331 in a direction of approaching the driven gear 322 or the lock plate in a state where at least the pin lock mechanism 330 is released, and the biasing means may or may not bias the lock pin in a state where the pin lock mechanism 330 is locked.

The lock pin restricting mechanism 340 may be any mechanism that automatically restricts the movement of the lock pin 331 toward the driven gear 322 or the lock plate after the pin lock mechanism 330 is released so that the pin lock mechanism 330 is maintained in the released state even if the user does not continue to pull the grip 331*f*, and automatically releases the restriction in accordance with the rotation of the driven gear 322 or the lock plate. For example, the shape of the groove portion 331*b* of the lock pin 331 and the shape of the convex portion 342*a* of the restricting portion 342 of the lock pin restricting mechanism 340 are arbitrary as long as they can be fitted to each other and prevent the lock pin 331 from moving in a direction approaching the driven gear 322 or the lock plate. Furthermore, the positional relationship between the releasing portion 344 of the lock pin restricting mechanism 340 and the convex portion 322*b* of the driven gear 322 or the lock plate and the shapes thereof are arbitrary as long as the restriction of the movement of the lock pin 331 by the lock pin restricting mechanism 340 can be released before or when the pin hole 322*a* comes in front of the pin portion 331*a* of the lock pin 331. The shaft portion 341, the restricting portion 342, and the releasing portion 344 of the lock pin restricting mechanism 340 are preferably lower in density than the magnetic body portion 342*b* of the restricting portion 342 so as to be easily attracted by the magnet 343 as a whole. The shaft portion 341, the restricting portion 342 (excluding the magnetic body portion 342*b*), and the releasing portion 344 are preferably formed of a lightweight resin material. Furthermore, the biasing means for biasing the entire restricting portion 342 in the direction of approaching the lock pin 331 is not limited to the magnet 343, and other biasing means such as a leaf spring may be used. Moreover, the lock pin restricting mechanism 340 and the corresponding convex portion 322*b* may be omitted.

Instead of or in addition to the pin lock mechanism 330 and the pin hole 322*a*, any lock mechanism can be adopted as long as the rotation of the rotating part 22 is automatically locked when the new media holding part 21 is moved to the media supply position, and then the lock can be released by manual operation. For example, such a lock mechanism includes an electrically or mechanically controlled disc brake system. Even when such a lock mechanism is adopted, the lock pin restricting mechanism 340 and the corresponding convex portion 322*b* may be omitted.

Seventh Modified Example

From the viewpoint of preventing accidents and failures, in order to prevent the rotating part 22 from rapidly rotating in a direction opposite to the media exchanging direction when the rotating part 22 is rotated in the media exchanging direction by the driving portion 23, in particular by human power, a device for preventing or suppressing reverse rotation of a ratchet mechanism, a rotary damper, a disc damper, a torque limiter, or the like may be provided in the media exchanger 20 (e.g., the drive transmission mechanism 320, the rotation shaft portion 310, etc.).

For example, as illustrated in FIGS. 18 and 19, a ratchet mechanism 400 may be provided on the rotation axis of the handle 300. The ratchet mechanism 400 includes a ratchet gear 410 fixed to a rotation axis of the handle 300 and a pawl portion 420 that restricts rotation of the ratchet gear 410 in one direction. The ratchet gear 410 includes one or more teeth that do not engage with a pawl 420*a* of the pawl portion 420 described later when the ratchet gear 410 rotates in one direction (clockwise in FIG. 19) and engage with the pawl 420*a* when the ratchet gear rotates in the opposite direction (counterclockwise in FIG. 19). The pawl portion 420 includes a pawl (or nail) 420*a* biased toward the ratchet gear 410 by, for example, a spring.

Figure 20:
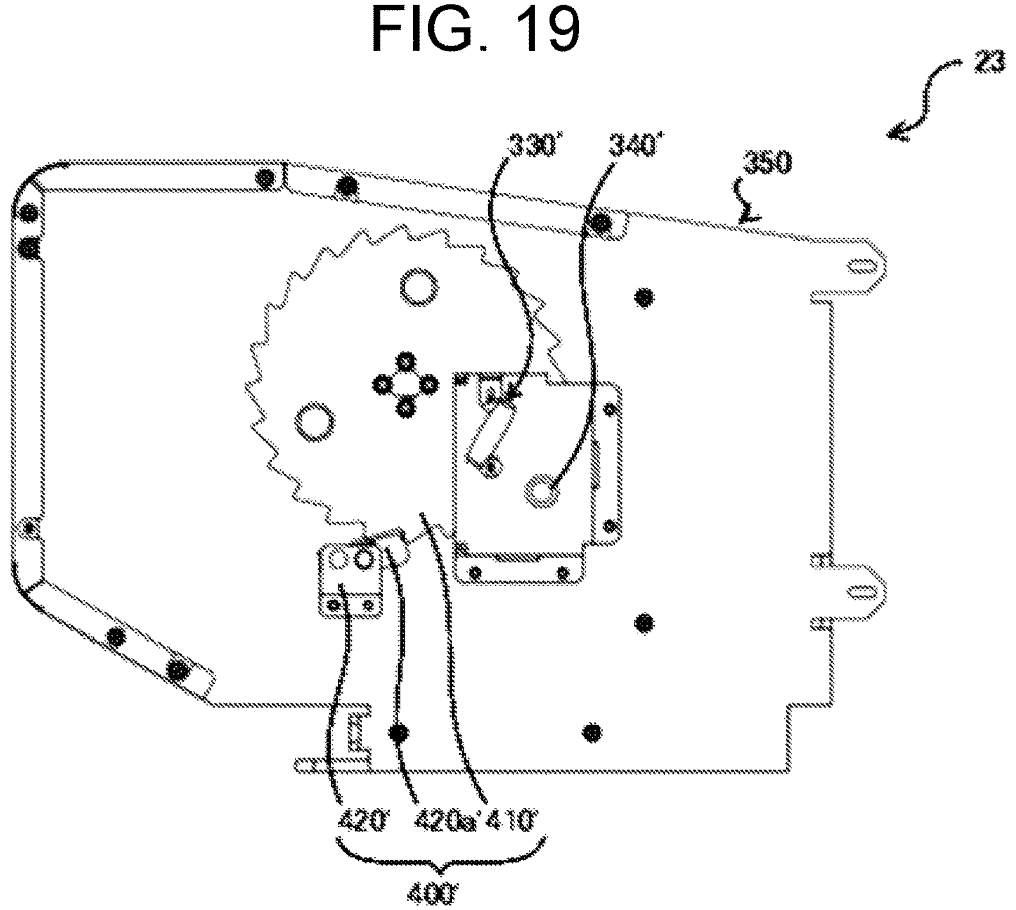
FIG. 20 is a front view illustrating a left side portion of a driving portion according to one modified example.

In addition, for example, as illustrated in FIG. 20, a ratchet mechanism 400' may be provided on the rotation shaft portion 310 at the left side portion of the driving portion 23. The ratchet mechanism 400' includes a ratchet gear 410' fixed to the left end of the rotation shaft portion 310 and a pawl portion 420' that restricts the rotation of the ratchet gear 410' in one direction. The ratchet gear 410' includes one or more teeth that do not engage the pawl 420*a'* of the pawl portion 420' described below when the ratchet gear 410' rotates in one direction (counterclockwise in FIG. 20), but engage the pawl 420*a'* when the ratchet gear rotates in the opposite direction (clockwise in FIG. 20). The pawl portion 420' includes a pawl (or nail) 420*a'* biased towards the ratchet gear 410' by, for example, a spring.

Figure 21:
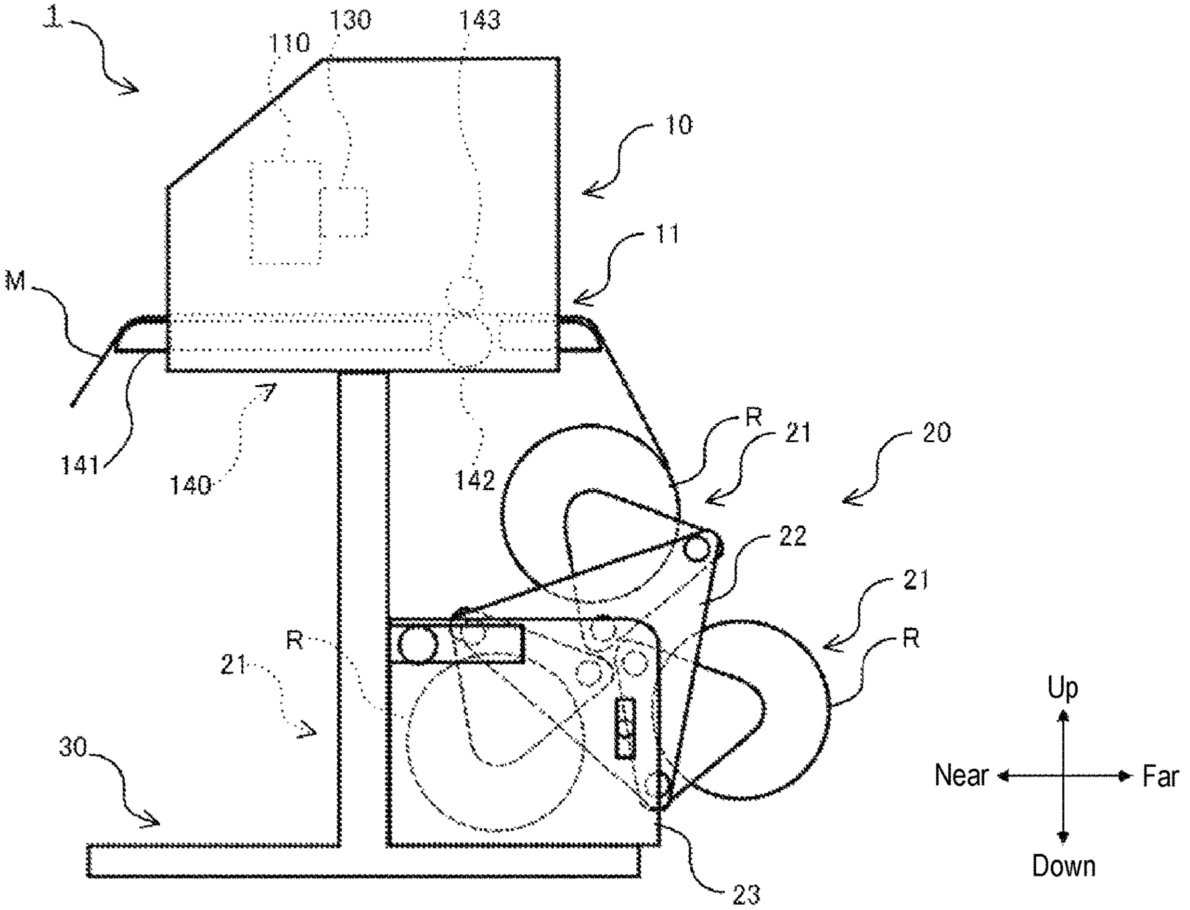
FIG. 21 is a side view schematically illustrating a printer including a feeding mechanism according to one modified example.

In addition, as illustrated in FIG. 21, a pin lock mechanism 330' and a lock pin restricting mechanism 340' for stopping the rotation of the ratchet gear 410' at every constant angle may be provided on the left side portion of the driving portion 23. Since the configurations of the pin lock mechanism 330' and the lock pin restricting mechanism 340' are similar to the configurations of the pin lock mechanism 330 and the lock pin restricting mechanism 340, detailed description thereof will be omitted. In this case, similarly to the driven gear 322, the ratchet gear 410' is provided with a pin hole corresponding to the lock pin of the lock pin restricting mechanism 340' and a convex portion that moves the lock pin restricting mechanism 340'. In addition, the pin hole of the ratchet gear 410' is provided in the ratchet gear 410' at a position where the lock pin of the lock pin restricting mechanism 340' is fitted when the lock pin 331 is fitted in the pin hole 322*a* of the driven gear 322.

In addition, from the viewpoint of preventing accidents and failures, in order to prevent the rotating part 22 from suddenly rotating in the media exchanging direction when the rotating part 22 is rotated in the media exchanging direction by the driving portion 23 particularly by human power, a device for suppressing rotation of a rotary damper, a disc damper, or the like may be provided in the media exchanger 20 (e.g., the drive transmission mechanism 320, the rotation shaft portion 310, etc.). For example, such rapid rotation of the rotating part 22 in the media exchanging direction may occur when the hand is released from the handle 300 while the media holding part 21, on which the roll R having a large weight is mounted, is located above in the middle of turning the handle 300. Such rapid rotation of the rotating part 22 in the media exchanging direction leads to rapid rotation of the media holding part 21 on which the roll R having a large weight is mounted and rapid rotation of the handle 300, which may harm a person in the vicinity of the media holding part 21 or a person who turned the handle 300. For example, as illustrated in FIG. 18, the disc damper 500 may be attached to the rotation axes of the handle 300 and the drive gear 321. In FIG. 18, since the disk damper 500 is fixed to the back surface of supporting portion 350, the disk damper 500 is indicated by a broken line.

From the viewpoint of preventing accidents and failures, a torque limiter may be provided in the media exchanger 20 (e.g., the drive transmission mechanism 320, the rotation shaft portion 310, etc.) in order to prevent the rotating part 22 from rotating in the media exchanging direction or the opposite direction thereof with a certain force or greater by the driving portion 23, particularly by human power. For example, in a case where the lock pin 331 is fitted in the pin hole 322*a* of the driven gear 322, or in a case where the rotation of the rotating part 22 in the direction opposite to the media exchanging direction is prevented by a device that prevents reverse rotation such as the ratchet mechanisms 400 and 400', the machine may be damaged when the handle 300 is forcibly rotated. The torque limiter prevents such forcible rotation of the handle 300. Furthermore, for example, when the handle 300 is rotated in a case where the roll R having a large weight is mounted on the media holding part 21, a force exceeding the mechanical strength may be applied to the handle 300 or the drive transmission mechanism 320. Even in such a case, the torque limiter can prevent the rotation of the handle 300 and hence the rotation of the rotating part 22. For example, as illustrated in FIG. 18, a torque limiter 600 may be provided on the rotation axis of handle 300.

In addition, from the viewpoint of preventing accidents and failures, even when the driving portion 23 is configured to be able to rotate the rotating part 22 in a direction opposite to the media exchanging direction by the driving portion 23 (e.g., in a case where the lock pin restricting mechanism 340 and the corresponding convex portion 322*b* are omitted in the embodiment described above), a device for suppressing rotation such as a rotary damper, a disc damper, a torque limiter, or the like may be provided in the media exchanger 20 (e.g., the drive transmission mechanism 320, the rotation shaft portion 310, etc.).

Eighth Modified Example

In the embodiment described above, the media exchanger 20 (in particular, the media holding part 21) is not provided with the drive-type feed mechanism (e.g., the driving roller) that actively supplies the media M from the roll R to the printing portion 10, but in order to assist the supply of the media M to the printing portion 10, the media exchanger 20 (in particular, each media holding part 21) may be provided with a drive-type feeding mechanism driven by a prime mover, human power, or the like. For example, the media holding part 21 may be provided with a driving roller disposed at a position that abuts with the roll R. Furthermore, one or both of the fitting portions 223 and 233 of the clamping parts 220 and 230 may be configured to rotate by a prime mover or human power so that the media M can be supplied from the roll R attached thereto to the printing portion 10.

Ninth Modified Example

The feeding mechanism 140 is arbitrary as long as it can feed the media M supplied from the media exchanger 20 in a predetermined direction.

For example, in the feeding mechanism 140, other conveying means configured to convey the media M in a predetermined direction may be used instead of the driving roller. Examples of such other conveying means include a winding device, a belt conveyor, and the like that rewinds the printed media M into a roll form. Such a winding device may be used in combination with a platen, belt conveyor, driving roller, or the like disposed facing the print head 110.

In the feeding mechanism 140, instead of the pinch roller, other pressing means for pressing the media M being conveyed against the conveying means may be used. Examples of such a pressing means include a pressing plate having a smooth surface toward the media M. In the feeding mechanism 140, a pressing means such as a pinch roller may be omitted. For example, when the media M, which is a fabric, is conveyed by a belt conveyor, a base pasting agent may be applied to the belt of the belt conveyor instead of using the pressing means.

For example, as illustrated in FIG. 18, the feeding mechanism may include a driving roller 142 and a plurality of pinch rollers 143 between a supply port 11 through which the media M is supplied to the printing portion 10 and a region where the ink ejected from the print head 110 lands. The driving roller 142 is, for example, a roller having a wide width in the left-right direction (a direction perpendicular to the plane of drawing in FIG. 18), and is rotated by a driving motor (not illustrated). A plurality of pinch rollers 143 are arranged side by side in the left-right direction so as to sandwich the media M between the pinch roller 143 and the driving roller 142. The media M is fed in the sub scanning direction by the rotation of the driving roller 142. In place of the pinch roller 143, one or more arbitrary driven or driving rollers that can sandwich the media M together with the driving roller 142 and feed the media M in a predetermined direction may be used.

The present invention enables various embodiments and modified examples without deviating from the broad spirit and scope of the present invention. In addition, the embodiments described above are for describing one embodiment of the present invention, and do not limit the scope of the present invention. The above embodiments and modified examples can be arbitrarily combined. Furthermore, even if a part of the constituent elements of the above embodiment is removed as necessary, it is within the scope of the technical idea of the present invention.

The present application claims priority based on Japanese Patent Application No. 2021-129764 and Japanese Patent Application No. 2021-129765 filed on Aug. 6, 2021. The disclosed content of this original patent application is hereby incorporated by reference in its entirety.

The invention claimed is:

1. A media exchanger capable of holding a plurality of media rolls and moving a media roll which is specific in the plurality of media rolls to a media supply position where a media is capable of being supplied from the media roll to a printing portion of a printing device, the media exchanger comprising:
- a plurality of media holding parts;
- a rotating part, configured to hold the plurality of media holding parts in an arrangement such that, when a rotation is performed about a rotation axis, the media roll held by each of the media holding parts comes to the media supply position once in a process of the rotation; and
- a driving portion, configured to rotate the rotating part about the rotation axis, wherein the driving portion includes:
- a handle, configured to receive a power to be turned;
- a rotation shaft portion, configured to be fixed such that a rotation axis thereof is coaxial with the rotating part;
- a drive transmission mechanism, configured to transmit the power by a rotation of the handle to the rotation shaft portion, so as to rotate the rotation shaft portion;
- a pin lock mechanism, configured to automatically perform a lock of the rotation of the rotating part when a new media holding part is moved to the media supply position, and thereafter releases the lock by a manual operation;
- a lock pin restricting mechanism, configured to automatically restrict a movement of a lock pin of the pin lock mechanism approaching a driven gear of the drive transmission mechanism after the pin lock mechanism is released; and
- a supporting portion, configured to operably support the handle, the rotation shaft portion, the drive transmission mechanism, the pin lock mechanism, and the lock pin restricting mechanism, wherein each of the media holding parts includes:
- a set of clamping parts, configured to rotatably sandwich @ single media roll; and
- a guide part, configured to slidably support one or both of the clamping parts.

2. The media exchanger as set forth in claim 1, wherein the guide part of at least one of the media holding parts includes a plurality of guide rods.

3. A printing device comprising:
- the printing portion, configured to perform a printing on the media; and
- the media exchanger according to claim 2, configured to supply the media to the printing portion.

4. The media exchanger as set forth in claim 1, wherein the guide part of at least one of the media holding parts is configured to slidably support both of the clamping parts of the media holding part.

5. A printing device comprising:
- the printing portion, configured to perform a printing on the media; and
- the media exchanger according to claim 3, configured to supply the media to the printing portion.

6. A printing device comprising:
- the printing portion, configured to perform a printing on the media; and
- the media exchanger according to claim 1, configured to supply the media to the printing portion.

7. A media exchanger capable of holding a plurality of media rolls and moving a media roll which is specific in the plurality of media rolls to a media supply position where a media is capable of being supplied from the media roll to a printing portion of a printing device, the media exchanger comprising:
- a plurality of media holding parts, each configured to hold a single media roll;
- a rotating part, configured to hold the plurality of media holding parts in an arrangement such that, when a rotation is performed about a rotation axis, the media roll held by each of the media holding parts comes to the media supply position once in a process of the rotation;
- a driving portion, configured to rotate the rotating part about the rotation axis; and
- a ratchet mechanism, configured to prevent a reverse rotation of the rotating part, wherein the driving portion includes:
- a handle, configured to receive a power to be turned;
- a rotation shaft portion, configured to be fixed such that a rotation axis thereof is coaxial with the rotating part;
- a drive transmission mechanism, configured to transmit the power by a rotation of the handle to the rotation shaft portion, so as to rotate the rotation shaft portion;
- a pin lock mechanism, configured to automatically perform a lock of the rotation of the rotating part when a new media holding part is moved to the media supply position, and thereafter releases the lock by a manual operation;
- a lock pin restricting mechanism, configured to automatically restrict a movement of a lock pin of the pin lock mechanism approaching a driven gear of the drive transmission mechanism after the pin lock mechanism is released; and a supporting portion, configured to operably support the handle, the rotation shaft portion, the drive transmission mechanism, the pin lock mechanism, and the lock pin restricting mechanism.

8. A printing device comprising:

the printing portion, configured to perform a printing on the media; and the media exchanger according to claim 7, configured to supply the media to the printing portion.

9. A printing device comprising:

a printing portion, configured to perform a printing on a media while feeds the media in a predetermined direction; and a media exchanger, capable of holding a plurality of media rolls, and capable of moving a media roll which is specific in the plurality of media rolls to a media supply position where the media is capable of being supplied from the media roll to the printing portion;

wherein the printing portion includes a drive-type feeding mechanism that feeds the media, wherein the media exchanger comprising:

a plurality of media holding parts, each configured to hold a single media roll;

a rotating part, configured to hold the plurality of media holding parts in an arrangement such that, when a rotation is performed about a rotation axis, the media roll held by each of the media holding parts comes to the media supply position once in a process of the rotation; and a driving portion, configured to rotate the rotating part about the rotation axis;

wherein the driving portion includes:

a handle, configured to receive a power to be turned;

a rotation shaft portion, configured to be fixed such that a rotation axis thereof is coaxial with the rotating part;

a drive transmission mechanism, configured to transmit the power by a rotation of the handle to the rotation shaft portion, so as to rotate the rotation shaft portion;

a pin lock mechanism, configured to automatically perform a lock of the rotation of the rotating part when a new media holding part is moved to the media supply position, and thereafter releases the lock by a manual operation;

a lock pin restricting mechanism, configured to automatically restrict a movement of a lock pin of the pin lock mechanism approaching a driven gear of the drive transmission mechanism after the pin lock mechanism is released; and a supporting portion, configured to operably support the handle, the rotation shaft portion, the drive transmission mechanism, the pin lock mechanism, and the lock pin restricting mechanism.

* * * * *